US011942716B2

(12) United States Patent
Liu et al.

(10) Patent No.: US 11,942,716 B2
(45) Date of Patent: Mar. 26, 2024

(54) HIGH SPEED ELECTRICAL CONNECTOR

(71) Applicant: Amphenol Commercial Products (Chengdu) Co., Ltd., Chengdu (CN)

(72) Inventors: Bing Liu, Chengdu (CN); Yaohua Hou, Chengdu (CN); Tao Zeng, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 91 days.

(21) Appl. No.: 17/477,391

(22) Filed: Sep. 16, 2021

(65) Prior Publication Data

US 2022/0094099 A1 Mar. 24, 2022

(30) Foreign Application Priority Data

Sep. 22, 2020 (CN) ......................... 202022110410.5
Jan. 22, 2021 (CN) ......................... 202120186566.3

(51) Int. Cl.
*H01R 13/502* (2006.01)
*H01R 13/6471* (2011.01)
*H01R 12/72* (2011.01)

(52) U.S. Cl.
CPC ....... *H01R 13/502* (2013.01); *H01R 13/6471* (2013.01); *H01R 12/721* (2013.01)

(58) Field of Classification Search
CPC .. H01R 12/712; H01R 12/714; H01R 12/716; H01R 12/721; H01R 13/6599; H01R 13/6471; H01R 13/502
(Continued)

(56) References Cited

U.S. PATENT DOCUMENTS 2,996,710 A 8/1961 Pratt
3,002,162 A 9/1961 Garstang
(Continued)

FOREIGN PATENT DOCUMENTS

CN 1075390 A 8/1993
CN 1098549 A 2/1995
(Continued)

OTHER PUBLICATIONS

Chinese Invalidation Request dated Aug. 17, 2021 in connection with Chinese Application No. 2005800409065.
(Continued)

*Primary Examiner* — Marcus E Harcum
(74) *Attorney, Agent, or Firm* — Wolf, Greenfield & Sacks, P.C.

(57) ABSTRACT

A configurable electrical connector. The electrical connector includes conductors held by a housing. Contact tails of the conductors extend from a mounting face of the housing therethrough. The mounting face of the housing includes a slot. In some embodiments, the slot exposes portions of ground conductors of the connector and receives a member coupled with the exposed portions of the ground conductors such that the electrical connector can meet high performance requirements. The member may be inserted into or molded in the slot. In some embodiments, the slot may or may not receive a member that is insulative when the electrical connector does not need to meet the high performance requirements. Such a configuration enables the same connector to be compatible with multiple performance protocols.

20 Claims, 7 Drawing Sheets

(58) Field of Classification Search
USPC .................................. 439/74, 86, 82, 607.02
See application file for complete search history.

(56) References Cited

U.S. PATENT DOCUMENTS 3,134,950 A 5/1964 Cook
3,243,756 A 3/1966 Ruete et al.
3,322,885 A 5/1967 May et al.
3,390,369 A 6/1968 Zavertnik et al.
3,390,389 A 6/1968 Bluish
3,505,619 A 4/1970 Bishop
3,573,677 A 4/1971 Detar
3,731,259 A 5/1973 Occhipinti
3,743,978 A 7/1973 Fritz
3,745,509 A 7/1973 Woodward et al.
3,786,372 A 1/1974 Epis et al.
3,825,874 A 7/1974 Peverill
3,848,073 A 11/1974 Simons et al.
3,863,181 A 1/1975 Glance et al.
3,999,830 A 12/1976 Herrmann, Jr. et al.
4,155,613 A 5/1979 Brandeau
4,175,821 A 11/1979 Hunter
4,195,272 A 3/1980 Boutros
4,215,910 A 8/1980 Walter
4,272,148 A 6/1981 Knack, Jr.
4,276,523 A 6/1981 Boutros et al.
4,371,742 A 2/1983 Manly
4,408,255 A 10/1983 Adkins
4,447,105 A 5/1984 Ruehl
4,457,576 A 7/1984 Cosmos et al.
4,471,015 A 9/1984 Ebneth et al.
4,472,765 A 9/1984 Hughes
4,484,159 A 11/1984 Whitley
4,490,283 A 12/1984 Kleiner
4,518,651 A 5/1985 Wolfe, Jr.
4,519,664 A 5/1985 Tillotson
4,519,665 A 5/1985 Althouse et al.
4,571,014 A 2/1986 Robin et al.
4,605,914 A 8/1986 Harman
4,607,907 A 8/1986 Bogursky
4,632,476 A 12/1986 Schell
4,636,752 A 1/1987 Saito
4,655,518 A 4/1987 Johnson et al.
4,674,812 A 6/1987 Thom et al.
4,678,260 A 7/1987 Gallusser et al.
4,682,129 A 7/1987 Bakermans et al.
4,686,607 A 8/1987 Johnson
4,728,762 A 3/1988 Roth et al.
4,737,598 A 4/1988 O'Connor
4,751,479 A 6/1988 Parr
4,761,147 A 8/1988 Gauthier
4,806,107 A 2/1989 Arnold et al.
4,824,383 A 4/1989 Lemke
4,836,791 A 6/1989 Grabbe et al.
4,846,724 A 7/1989 Sasaki et al.
4,846,727 A 7/1989 Glover et al.
4,871,316 A 10/1989 Herrell et al.
4,876,630 A 10/1989 Dara
4,878,155 A 10/1989 Conley
4,889,500 A 12/1989 Lazar et al.
4,902,243 A 2/1990 Davis
4,948,922 A 8/1990 Varadan et al.
4,970,354 A 11/1990 Iwasa et al.
4,971,726 A 11/1990 Maeno et al.
4,975,084 A 12/1990 Fedder et al.
4,984,992 A 1/1991 Beamenderfer et al.
4,992,060 A 2/1991 Meyer
5,000,700 A 3/1991 Masubuchi et al.
5,046,084 A 9/1991 Barrett et al.
5,046,952 A 9/1991 Cohen et al.
5,046,960 A 9/1991 Fedder
5,066,236 A 11/1991 Broeksteeg
5,135,405 A 8/1992 Fusselman et al.
5,141,454 A 8/1992 Garrett et al.
5,150,086 A 9/1992 Ito
5,166,527 A 11/1992 Solymar
5,168,252 A 12/1992 Naito
5,168,432 A 12/1992 Murphy et al.
5,176,538 A 1/1993 Hansell, III et al.
5,190,472 A 3/1993 Voltz et al.
5,246,388 A 9/1993 Collins et al.
5,259,773 A 11/1993 Champion et al.
5,266,055 A 11/1993 Naito et al.
5,280,257 A 1/1994 Cravens et al.
5,281,762 A 1/1994 Long et al.
5,287,076 A 2/1994 Johnescu et al.
5,323,299 A 6/1994 Weber
5,334,050 A 8/1994 Andrews
5,335,146 A 8/1994 Stucke
5,340,334 A 8/1994 Nguyen
5,346,410 A 9/1994 Moore, Jr.
5,352,123 A 10/1994 Sample et al.
5,403,206 A 4/1995 McNamara et al.
5,407,622 A 4/1995 Cleveland et al.
5,429,520 A 7/1995 Morlion et al.
5,429,521 A 7/1995 Morlion et al.
5,433,617 A 7/1995 Morlion et al.
5,433,618 A 7/1995 Morlion et al.
5,456,619 A 10/1995 Belopolsky et al.
5,461,392 A 10/1995 Mott et al.
5,474,472 A 12/1995 Niwa et al.
5,484,310 A 1/1996 McNamara et al.
5,490,372 A 2/1996 Schlueter
5,496,183 A 3/1996 Soes et al.
5,499,935 A 3/1996 Powell
5,539,148 A 7/1996 Konishi et al.
5,551,893 A 9/1996 Johnson
5,554,050 A 9/1996 Marpoe, Jr.
5,562,497 A 10/1996 Yagi et al.
5,564,949 A 10/1996 Wellinsky
5,571,991 A 11/1996 Highum et al.
5,597,328 A 1/1997 Mouissie
5,605,469 A 2/1997 Wellinsky et al.
5,620,340 A 4/1997 Andrews
5,651,702 A 7/1997 Hanning et al.
5,660,551 A 8/1997 Sakurai
5,669,789 A 9/1997 Law
5,702,258 A 12/1997 Provencher et al.
5,755,597 A 5/1998 Panis et al.
5,795,191 A 8/1998 Preputnick et al.
5,796,323 A 8/1998 Uchikoba et al.
5,803,768 A 9/1998 Zell et al.
5,831,491 A 11/1998 Buer et al.
5,833,486 A 11/1998 Shinozaki
5,833,496 A 11/1998 Hollander et al.
5,842,887 A 12/1998 Andrews
5,870,528 A 2/1999 Fukuda
5,885,095 A 3/1999 Cohen et al.
5,887,158 A 3/1999 Sample et al.
5,904,594 A 5/1999 Longueville et al.
5,924,899 A 7/1999 Paagman
5,931,686 A 8/1999 Sasaki et al.
5,959,591 A 9/1999 Aurand
5,961,355 A 10/1999 Morlion et al.
5,971,809 A 10/1999 Ho
5,980,321 A 11/1999 Cohen et al.
5,981,869 A 11/1999 Kroger
5,982,253 A 11/1999 Perrin et al.
5,993,259 A 11/1999 Stokoe et al.
5,997,361 A 12/1999 Driscoll et al.
6,019,616 A 2/2000 Yagi et al.
6,042,394 A 3/2000 Mitra et al.
6,083,047 A 7/2000 Paagman
6,102,747 A 8/2000 Paagman
6,116,926 A 9/2000 Ortega et al.
6,120,306 A 9/2000 Evans
6,123,554 A 9/2000 Ortega et al.
6,132,255 A 10/2000 Verhoeven
6,132,355 A 10/2000 Derie
6,135,824 A 10/2000 Okabe et al.
6,146,202 A 11/2000 Ramey et al.
6,152,274 A 11/2000 Blard et al.
6,152,742 A 11/2000 Cohen et al.
6,152,747 A 11/2000 McNamara

(56) References Cited

U.S. PATENT DOCUMENTS 6,163,464 A 12/2000 Ishibashi et al.
6,168,469 B1 1/2001 Lu
6,171,115 B1 1/2001 Mickievicz et al.
6,171,149 B1 1/2001 van Zanten
6,174,202 B1 1/2001 Mitra
6,174,203 B1 1/2001 Asao
6,174,944 B1 1/2001 Chiba et al.
6,179,651 B1 1/2001 Huang
6,179,663 B1 1/2001 Bradley et al.
6,196,853 B1 3/2001 Harting et al.
6,203,396 B1 3/2001 Asmussen et al.
6,206,729 B1 3/2001 Bradley et al.
6,210,182 B1 4/2001 Elco et al.
6,210,227 B1 4/2001 Yamasaki et al.
6,217,372 B1 4/2001 Reed
6,227,875 B1 5/2001 Wu et al.
6,231,391 B1 5/2001 Ramey et al.
6,238,245 B1 5/2001 Stokoe et al.
6,267,604 B1 7/2001 Mickievicz et al.
6,273,758 B1 8/2001 Lloyd et al.
6,293,827 B1 9/2001 Stokoe
6,296,496 B1 10/2001 Trammel
6,299,438 B1 10/2001 Sahagian et al.
6,299,483 B1 10/2001 Cohen et al.
6,299,484 B2 10/2001 Van Woensel
6,299,492 B1 10/2001 Pierini et al.
6,328,572 B1 12/2001 Higashida et al.
6,328,601 B1 12/2001 Yip et al.
6,333,468 B1 12/2001 Endoh et al.
6,343,955 B2 2/2002 Billman et al.
6,343,957 B1 2/2002 Kuo et al.
6,347,962 B1 2/2002 Kline
6,350,134 B1 2/2002 Fogg et al.
6,358,088 B1 3/2002 Nishio et al.
6,358,092 B1 3/2002 Siemon et al.
6,364,711 B1 4/2002 Berg et al.
6,364,713 B1 4/2002 Kuo
6,375,510 B2 4/2002 Asao
6,379,188 B1 4/2002 Cohen et al.
6,380,485 B1 4/2002 Beaman et al.
6,392,142 B1 5/2002 Uzuka et al.
6,394,839 B2 5/2002 Reed
6,396,712 B1 5/2002 Kuijk
6,398,588 B1 6/2002 Bickford
6,409,543 B1 6/2002 Astbury, Jr. et al.
6,413,119 B1 7/2002 Gabrisko, Jr. et al.
6,428,344 B1 8/2002 Reed
6,431,914 B1 8/2002 Billman
6,435,913 B1 8/2002 Billman
6,435,914 B1 8/2002 Billman
6,441,313 B1 8/2002 Novak
6,454,605 B1 9/2002 Bassler et al.
6,461,202 B2 10/2002 Kline
6,471,549 B1 10/2002 Lappohn
6,478,624 B2 11/2002 Ramey et al.
6,482,017 B1 11/2002 Van Doorn
6,491,545 B1 12/2002 Spiegel et al.
6,503,103 B1 1/2003 Cohen et al.
6,506,076 B2 1/2003 Cohen et al.
6,517,360 B1 2/2003 Cohen
6,520,803 B1 2/2003 Dunn
6,527,587 B1 3/2003 Ortega et al.
6,528,737 B1 3/2003 Kwong et al.
6,530,790 B1 3/2003 McNamara et al.
6,533,613 B1 3/2003 Turner et al.
6,537,087 B2 3/2003 McNamara et al.
6,538,524 B1 3/2003 Miller
6,538,899 B1 3/2003 Krishnamurthi et al.
6,540,522 B2 4/2003 Sipe
6,540,558 B1 4/2003 Paagman
6,540,559 B1 4/2003 Kemmick et al.
6,541,712 B1 4/2003 Gately et al.
6,544,072 B2 4/2003 Olson
6,544,647 B1 4/2003 Hayashi et al.
6,551,140 B2 4/2003 Billman et al.
6,554,647 B1 4/2003 Cohen et al.
6,565,387 B2 5/2003 Cohen
6,565,390 B2 5/2003 Wu
6,579,116 B2 6/2003 Brennan et al.
6,582,244 B2 6/2003 Fogg et al.
6,585,540 B2 7/2003 Gutierrez et al.
6,592,381 B2 7/2003 Cohen et al.
6,595,802 B1 7/2003 Watanabe et al.
6,602,095 B2 8/2003 Astbury, Jr. et al.
6,607,402 B2 8/2003 Cohen et al.
6,608,762 B2 8/2003 Patriche
6,609,933 B2 8/2003 Yamasaki
6,612,871 B1 9/2003 Givens
6,616,482 B2 9/2003 De La Cruz et al.
6,616,864 B1 9/2003 Jiang et al.
6,621,373 B1 9/2003 Mullen et al.
6,652,318 B1 11/2003 Winings et al.
6,652,319 B1 11/2003 Billman
6,655,966 B2 12/2003 Rothermel et al.
6,663,427 B1 12/2003 Billman et al.
6,663,429 B1 12/2003 Korsunsky et al.
6,692,272 B2 2/2004 Lemke et al.
6,705,895 B2 3/2004 Hasircoglu
6,706,974 B2 3/2004 Chen et al.
6,709,294 B1 3/2004 Cohen et al.
6,712,648 B2 3/2004 Padro et al.
6,713,672 B1 3/2004 Stickney
6,717,825 B2 4/2004 Volstorf
6,722,897 B1 4/2004 Wu
6,741,141 B2 5/2004 Kormanyos
6,743,057 B2 6/2004 Davis et al.
6,749,444 B2 6/2004 Murr et al.
6,762,941 B2 7/2004 Roth
6,764,341 B2 7/2004 Lappoehn
6,776,645 B2 8/2004 Roth et al.
6,776,659 B1 8/2004 Stokoe et al.
6,786,771 B2 9/2004 Gailus
6,792,941 B2 9/2004 Andersson
6,806,109 B2 10/2004 Furuya et al.
6,808,419 B1 10/2004 Korsunsky et al.
6,808,420 B2 10/2004 Whiteman, Jr. et al.
6,814,519 B2 11/2004 Policicchio et al.
6,814,619 B1 11/2004 Stokoe et al.
6,816,486 B1 11/2004 Rogers
6,817,870 B1 11/2004 Kwong et al.
6,823,587 B2 11/2004 Reed
6,830,478 B1 12/2004 Ko et al.
6,830,483 B1 12/2004 Wu
6,830,489 B2 12/2004 Aoyama
6,857,899 B2 2/2005 Reed et al.
6,872,085 B1 3/2005 Cohen et al.
6,875,031 B1 4/2005 Korsunsky et al.
6,899,566 B2 5/2005 Kline et al.
6,903,939 B1 6/2005 Chea, Jr. et al.
6,913,490 B2 7/2005 Whiteman, Jr. et al.
6,932,649 B1 8/2005 Rothermel et al.
6,957,967 B2 10/2005 Petersen et al.
6,960,103 B2 11/2005 Tokunaga
6,971,916 B2 12/2005 Tokunaga
6,979,202 B2 12/2005 Benham et al.
6,979,226 B2 12/2005 Otsu et al.
6,982,378 B2 1/2006 Dickson
7,004,793 B2 2/2006 Scherer et al.
7,021,969 B2 4/2006 Matsunaga
7,044,794 B2 5/2006 Consoli et al.
7,057,570 B2 6/2006 Irion, II et al.
7,074,086 B2 7/2006 Cohen et al.
7,094,102 B2 8/2006 Cohen et al.
7,108,556 B2 9/2006 Cohen et al.
7,120,327 B2 10/2006 Bozso et al.
7,137,849 B2 11/2006 Nagata
7,163,421 B1 1/2007 Cohen et al.
7,182,643 B2 2/2007 Winings et al.
7,229,318 B2 6/2007 Winings et al.
7,261,591 B2 8/2007 Korsunsky et al.
7,270,573 B2 9/2007 Houtz
7,285,018 B2 10/2007 Kenny et al.
7,303,427 B2 12/2007 Swain
7,309,239 B2 12/2007 Shuey et al.

(56) References Cited

U.S. PATENT DOCUMENTS 7,309,257 B1 12/2007 Minich
7,316,585 B2 1/2008 Smith et al.
7,322,855 B2 1/2008 Mongold et al.
7,331,830 B2 2/2008 Minich
7,335,063 B2 2/2008 Cohen et al.
7,347,721 B2 3/2008 Kameyama
7,351,114 B2 4/2008 Benham et al.
7,354,274 B2 4/2008 Minich
7,365,269 B2 4/2008 Donazzi et al.
7,371,117 B2 5/2008 Gailus
7,390,218 B2 6/2008 Smith et al.
7,390,220 B1 6/2008 Wu
7,407,413 B2 8/2008 Minich
7,494,383 B2 2/2009 Cohen et al.
7,540,781 B2 6/2009 Kenny et al.
7,554,096 B2 6/2009 Ward et al.
7,581,990 B2 9/2009 Kirk et al.
7,585,186 B2 9/2009 McAlonis et al.
7,588,464 B2 9/2009 Kim
7,588,467 B2 9/2009 Chang
7,594,826 B2 9/2009 Kobayashi et al.
7,604,490 B2 10/2009 Chen et al.
7,604,502 B2 10/2009 Pan
7,674,133 B2 3/2010 Fogg et al.
7,690,946 B2 4/2010 Knaub et al.
7,699,644 B2 4/2010 Szczesny et al.
7,699,663 B1 4/2010 Little et al.
7,722,401 B2 5/2010 Kirk et al.
7,731,537 B2 6/2010 Amleshi et al.
7,753,731 B2 7/2010 Cohen et al.
7,758,357 B2 7/2010 Pan et al.
7,771,233 B2 8/2010 Gailus
7,789,676 B2 9/2010 Morgan et al.
7,794,240 B2 9/2010 Cohen et al.
7,794,278 B2 9/2010 Cohen et al.
7,806,729 B2 10/2010 Nguyen et al.
7,828,595 B2 11/2010 Mathews
7,833,068 B2 11/2010 Bright et al.
7,871,296 B2 1/2011 Fowler et al.
7,874,873 B2 1/2011 Do et al.
7,887,371 B2 2/2011 Kenny et al.
7,887,379 B2 2/2011 Kirk
7,906,730 B2 3/2011 Atkinson et al.
7,914,304 B2 3/2011 Cartier et al.
7,927,143 B2 4/2011 Helster et al.
7,985,097 B2 7/2011 Gulla
8,018,733 B2 9/2011 Jia
8,057,267 B2 11/2011 Johnescu
8,083,553 B2 12/2011 Manter et al.
8,167,631 B2 5/2012 Ito et al.
8,182,289 B2 5/2012 Stokoe et al.
8,215,968 B2 7/2012 Cartier et al.
8,216,001 B2 7/2012 Kirk
8,251,745 B2 8/2012 Johnescu
8,267,721 B2 9/2012 Minich
8,272,877 B2 9/2012 Stokoe et al.
8,328,565 B2 12/2012 Westman et al.
8,348,701 B1 1/2013 Lan et al.
8,371,875 B2 2/2013 Gailus
8,382,524 B2 2/2013 Khilchenko et al.
8,545,240 B2 10/2013 Casher et al.
8,550,861 B2 10/2013 Cohen et al.
8,657,627 B2 2/2014 McNamara et al.
8,678,860 B2 3/2014 Minich et al.
8,715,003 B2 5/2014 Buck et al.
8,715,005 B2 5/2014 Pan
8,764,460 B2 7/2014 Smink et al.
8,764,488 B2 7/2014 Zeng
8,771,016 B2 7/2014 Atkinson et al.
8,864,521 B2 10/2014 Atkinson et al.
8,926,377 B2 1/2015 Kirk et al.
8,944,831 B2 2/2015 Stoner et al.
8,944,863 B1 2/2015 Yang
8,998,642 B2 4/2015 Manter et al.
9,004,942 B2 4/2015 Paniauqa
9,011,177 B2 4/2015 Lloyd et al.
9,022,806 B2 5/2015 Cartier, Jr. et al.
9,028,201 B2 5/2015 Kirk et al.
9,028,281 B2 5/2015 Kirk et al.
9,065,230 B2 6/2015 Milbrand, Jr.
9,077,115 B2 7/2015 Yang
9,083,130 B2 7/2015 Casher et al.
9,124,009 B2 9/2015 Atkinson et al.
9,166,317 B2 * 10/2015 Briant .................. H01R 12/737
9,219,335 B2 12/2015 Atkinson et al.
9,225,083 B2 12/2015 Krenceski et al.
9,225,085 B2 12/2015 Cartier, Jr. et al.
9,257,778 B2 2/2016 Buck et al.
9,257,794 B2 2/2016 Wanha et al.
9,300,074 B2 3/2016 Gailus
9,401,570 B2 7/2016 Phillips et al.
9,450,344 B2 9/2016 Cartier, Jr. et al.
9,461,378 B1 10/2016 Chen
9,484,674 B2 11/2016 Cartier, Jr. et al.
9,490,585 B2 * 11/2016 Yang .................. H01R 13/6585
9,490,587 B1 11/2016 Phillips et al.
9,509,101 B2 11/2016 Cartier, Jr. et al.
9,520,689 B2 12/2016 Cartier, Jr. et al.
9,634,432 B2 4/2017 Su et al.
9,692,183 B2 6/2017 Phillips
9,692,188 B2 6/2017 Godana et al.
9,705,218 B2 7/2017 Ito
9,705,255 B2 7/2017 Atkinson et al.
9,742,132 B1 8/2017 Hsueh
9,748,698 B1 8/2017 Morgan et al.
9,831,588 B2 11/2017 Cohen
9,843,135 B2 12/2017 Guetig et al.
9,899,774 B2 2/2018 Gailus
9,923,309 B1 3/2018 Aizawa et al.
9,972,945 B1 5/2018 Huang et al.
9,979,136 B1 * 5/2018 Wu .................... H01R 13/6597
9,985,389 B1 5/2018 Morgan et al.
10,038,284 B2 7/2018 Krenceski et al.
10,096,921 B2 10/2018 Johnescu et al.
10,122,129 B2 11/2018 Milbrand, Jr. et al.
10,148,025 B1 12/2018 Trout et al.
10,186,814 B2 1/2019 Khilchenko et al.
10,211,577 B2 2/2019 Milbrand, Jr. et al.
10,243,304 B2 3/2019 Kirk et al.
10,270,191 B1 4/2019 Li et al.
10,283,910 B1 5/2019 Chen et al.
10,348,040 B2 7/2019 Cartier, Jr. et al.
10,355,416 B1 7/2019 Pickel et al.
10,381,767 B1 8/2019 Milbrand, Jr. et al.
10,431,936 B2 10/2019 Horning et al.
10,446,983 B2 10/2019 Krenceski et al.
10,511,128 B2 12/2019 Kirk et al.
10,601,181 B2 3/2020 Lu et al.
10,777,921 B2 9/2020 Lu et al.
10,797,417 B2 10/2020 Scholeno et al.
10,847,936 B2 11/2020 Tang et al.
10,916,894 B2 2/2021 Kirk et al.
10,931,050 B2 2/2021 Cohen
10,938,162 B2 3/2021 Lin
10,965,063 B2 3/2021 Krenceski et al.
11,189,971 B2 11/2021 Lu
11,251,558 B1 * 2/2022 Lee .................... H01R 13/6599
11,316,307 B2 4/2022 Chen et al.
11,381,039 B2 7/2022 Hsiao et al.
11,469,553 B2 10/2022 Johnescu et al.
11,469,554 B2 10/2022 Ellison et al.
11,522,310 B2 12/2022 Cohen
11,539,171 B2 12/2022 Kirk et al.
11,600,950 B2 3/2023 Takai et al.
11,715,914 B2 8/2023 Cartier, Jr. et al.
11,757,224 B2 9/2023 Milbrand, Jr. et al.
11,799,246 B2 10/2023 Johnescu et al.
11,817,655 B2 11/2023 Liu et al.
11,817,657 B2 11/2023 Ellison et al.
2001/0012730 A1 8/2001 Ramey et al.
2001/0041477 A1 11/2001 Billman et al.
2001/0042632 A1 11/2001 Manov et al.
2001/0046810 A1 11/2001 Cohen et al.
2002/0042223 A1 4/2002 Belopolsky et al.

(56) References Cited

U.S. PATENT DOCUMENTS

2002/0086582 A1 7/2002 Nitta et al.
2002/0089464 A1 7/2002 Joshi
2002/0098738 A1 7/2002 Astbury et al.
2002/0102885 A1 8/2002 Kline
2002/0111068 A1 8/2002 Cohen et al.
2002/0111069 A1 8/2002 Astbury et al.
2002/0115335 A1 8/2002 Saito
2002/0123266 A1 9/2002 Ramey et al.
2002/0136506 A1 9/2002 Asada et al.
2002/0146926 A1 10/2002 Fogg et al.
2002/0168898 A1 11/2002 Billman et al.
2002/0172469 A1 11/2002 Benner et al.
2002/0181215 A1 12/2002 Guenthner
2002/0192988 A1 12/2002 Droesbeke et al.
2003/0003803 A1 1/2003 Billman et al.
2003/0008561 A1 1/2003 Lappoehn
2003/0008562 A1 1/2003 Yamasaki
2003/0022555 A1 1/2003 Vicich et al.
2003/0027439 A1 2/2003 Johnescu et al.
2003/0109174 A1 6/2003 Korsunsky et al.
2003/0143894 A1 7/2003 Kline et al.
2003/0147227 A1 8/2003 Egitto et al.
2003/0162441 A1 8/2003 Nelson et al.
2003/0220018 A1 11/2003 Winings et al.
2003/0220021 A1 11/2003 Whiteman et al.
2004/0001299 A1 1/2004 van Haaster et al.
2004/0005815 A1 1/2004 Mizumura et al.
2004/0020674 A1 2/2004 McFadden et al.
2004/0043661 A1 3/2004 Okada et al.
2004/0072473 A1 4/2004 Wu
2004/0097112 A1 5/2004 Minich et al.
2004/0115968 A1 6/2004 Cohen
2004/0121652 A1 6/2004 Gailus
2004/0171305 A1 9/2004 McGowan et al.
2004/0196112 A1 10/2004 Welbon et al.
2004/0224559 A1 11/2004 Nelson et al.
2004/0235352 A1 11/2004 Takemasa
2004/0259419 A1 12/2004 Payne et al.
2005/0006119 A1 1/2005 Cunningham et al.
2005/0020135 A1 1/2005 Whiteman et al.
2005/0039331 A1 2/2005 Smith
2005/0048838 A1 3/2005 Korsunsky et al.
2005/0048842 A1 3/2005 Benham et al.
2005/0070160 A1 3/2005 Cohen et al.
2005/0090299 A1 4/2005 Tsao et al.
2005/0133245 A1 6/2005 Katsuyama et al.
2005/0148239 A1 7/2005 Hull et al.
2005/0176300 A1 8/2005 Hsu et al.
2005/0176835 A1 8/2005 Kobayashi et al.
2005/0215121 A1 9/2005 Tokunaga
2005/0233610 A1 10/2005 Tutt et al.
2005/0277315 A1 12/2005 Mongold et al.
2005/0283974 A1 12/2005 Richard et al.
2005/0287869 A1 12/2005 Kenny et al.
2006/0009080 A1 1/2006 Regnier et al.
2006/0019517 A1 1/2006 Raistrick et al.
2006/0019538 A1 1/2006 Davis et al.
2006/0024983 A1 2/2006 Cohen et al.
2006/0024984 A1 2/2006 Cohen et al.
2006/0068640 A1 3/2006 Gailus
2006/0073709 A1 4/2006 Reid
2006/0104010 A1 5/2006 Donazzi et al.
2006/0110977 A1 5/2006 Matthews
2006/0141866 A1 6/2006 Shiu
2006/0166551 A1 7/2006 Korsunsky et al.
2006/0216969 A1 9/2006 Bright et al.
2006/0255876 A1 11/2006 Kushta et al.
2006/0292932 A1 12/2006 Benham et al.
2007/0004282 A1 1/2007 Cohen et al.
2007/0004828 A1 1/2007 Khabbaz
2007/0021000 A1 1/2007 Laurx
2007/0021001 A1 1/2007 Laurx et al.
2007/0021002 A1 1/2007 Laurx et al.
2007/0021003 A1 1/2007 Laurx et al.
2007/0021004 A1 1/2007 Laurx et al.
2007/0037419 A1 2/2007 Sparrowhawk
2007/0042639 A1 2/2007 Manter et al.
2007/0054554 A1 3/2007 Do et al.
2007/0059961 A1 3/2007 Cartier et al.
2007/0111597 A1 5/2007 Kondou et al.
2007/0141872 A1 6/2007 Szczesny et al.
2007/0155241 A1 7/2007 Lappohn
2007/0218765 A1 9/2007 Cohen et al.
2007/0275583 A1 11/2007 McNutt et al.
2008/0050968 A1 2/2008 Chang
2008/0194146 A1 8/2008 Gailus
2008/0246555 A1 10/2008 Kirk et al.
2008/0248658 A1 10/2008 Cohen et al.
2008/0248659 A1 10/2008 Cohen et al.
2008/0248660 A1 10/2008 Kirk et al.
2008/0318455 A1 12/2008 Beaman et al.
2009/0011641 A1 1/2009 Cohen et al.
2009/0011643 A1 1/2009 Amleshi et al.
2009/0011645 A1 1/2009 Laurx et al.
2009/0029602 A1 1/2009 Cohen et al.
2009/0035955 A1 2/2009 McNamara
2009/0061661 A1 3/2009 Shuey et al.
2009/0117386 A1 5/2009 Vacanti et al.
2009/0124101 A1 5/2009 Minich et al.
2009/0149045 A1 6/2009 Chen et al.
2009/0203259 A1 8/2009 Nguyen et al.
2009/0239395 A1 9/2009 Cohen et al.
2009/0258516 A1 10/2009 Hiew et al.
2009/0291593 A1 11/2009 Atkinson et al.
2009/0305530 A1 12/2009 Ito et al.
2009/0305533 A1 12/2009 Feldman et al.
2009/0305553 A1 12/2009 Thomas et al.
2010/0048058 A1 2/2010 Morgan et al.
2010/0081302 A1 4/2010 Atkinson et al.
2010/0099299 A1 4/2010 Moriyama et al.
2010/0144167 A1 6/2010 Fedder et al.
2010/0273359 A1 10/2010 Walker et al.
2010/0291806 A1 11/2010 Minich et al.
2010/0294530 A1 11/2010 Atkinson et al.
2011/0003509 A1 1/2011 Gailus
2011/0067237 A1 3/2011 Cohen et al.
2011/0104948 A1 5/2011 Girard, Jr. et al.
2011/0130038 A1 6/2011 Cohen et al.
2011/0212649 A1 9/2011 Stokoe et al.
2011/0212650 A1 9/2011 Amleshi et al.
2011/0230095 A1 9/2011 Atkinson et al.
2011/0230096 A1 9/2011 Atkinson et al.
2011/0256739 A1 10/2011 Toshiyuki et al.
2011/0287663 A1 11/2011 Gailus et al.
2012/0077380 A1 3/2012 Minich et al.
2012/0094536 A1 4/2012 Khilchenko et al.
2012/0115371 A1 5/2012 Chuang et al.
2012/0156929 A1 6/2012 Manter et al.
2012/0184154 A1 7/2012 Frank et al.
2012/0202363 A1 8/2012 McNamara et al.
2012/0202386 A1 8/2012 McNamara et al.
2012/0202387 A1 8/2012 McNamara
2012/0214343 A1 8/2012 Buck et al.
2012/0214344 A1 8/2012 Cohen et al.
2013/0012038 A1 1/2013 Kirk et al.
2013/0017733 A1 1/2013 Kirk et al.
2013/0065454 A1 3/2013 Milbrand Jr.
2013/0078870 A1 3/2013 Milbrand, Jr.
2013/0078871 A1 3/2013 Milbrand, Jr.
2013/0090001 A1 4/2013 Kagotani
2013/0109232 A1 5/2013 Paniaqua
2013/0143442 A1 6/2013 Cohen et al.
2013/0196553 A1 8/2013 Gailus
2013/0217263 A1 8/2013 Pan
2013/0225006 A1 8/2013 Khilchenko et al.
2013/0237092 A1 9/2013 Rubens
2013/0273781 A1 10/2013 Buck et al.
2013/0288513 A1* 10/2013 Masubuchi ............ H01R 31/08
439/386
2013/0316590 A1 11/2013 Hon
2013/0340251 A1 12/2013 Regnier et al.
2014/0004724 A1 1/2014 Cartier, Jr. et al.
2014/0004726 A1 1/2014 Cartier, Jr. et al.
2014/0004746 A1 1/2014 Cartier, Jr. et al.

(56) References Cited

U.S. PATENT DOCUMENTS

| | | | |
|---|---|---|---|
| 2014/0057498 | A1 | 2/2014 | Cohen |
| 2014/0273557 | A1 | 9/2014 | Cartier, Jr. et al. |
| 2014/0273627 | A1 | 9/2014 | Cartier, Jr. et al. |
| 2015/0056856 | A1 | 2/2015 | Atkinson et al. |
| 2015/0111427 | A1 | 4/2015 | Foxconn |
| 2015/0188250 | A1* | 7/2015 | Liu ...................... H01R 13/504 439/86 |
| 2015/0236451 | A1 | 8/2015 | Cartier, Jr. et al. |
| 2015/0236452 | A1 | 8/2015 | Cartier, Jr. et al. |
| 2015/0255926 | A1 | 9/2015 | Paniagua |
| 2015/0380868 | A1 | 12/2015 | Chen et al. |
| 2016/0000616 | A1 | 1/2016 | Lavoie |
| 2016/0134057 | A1 | 5/2016 | Buck et al. |
| 2016/0149343 | A1 | 5/2016 | Atkinson et al. |
| 2016/0156133 | A1 | 6/2016 | Masubuchi et al. |
| 2016/0172794 | A1 | 6/2016 | Sparrowhawk et al. |
| 2016/0211618 | A1 | 7/2016 | Gailus |
| 2017/0352970 | A1 | 12/2017 | Liang et al. |
| 2018/0062323 | A1 | 3/2018 | Kirk et al. |
| 2018/0109043 | A1 | 4/2018 | Provencher et al. |
| 2018/0145438 | A1 | 5/2018 | Cohen |
| 2018/0166828 | A1 | 6/2018 | Gailus |
| 2018/0198220 | A1 | 7/2018 | Sasame et al. |
| 2018/0205177 | A1 | 7/2018 | Zhou et al. |
| 2018/0212376 | A1 | 7/2018 | Wang et al. |
| 2018/0219331 | A1 | 8/2018 | Cartier, Jr. et al. |
| 2018/0269607 | A1 | 9/2018 | Wu et al. |
| 2019/0036256 | A1 | 1/2019 | Martens et al. |
| 2019/0052019 | A1 | 2/2019 | Huang et al. |
| 2019/0067854 | A1 | 2/2019 | Ju et al. |
| 2019/0131743 | A1 | 5/2019 | Hsu et al. |
| 2019/0173209 | A1 | 6/2019 | Lu et al. |
| 2019/0173232 | A1 | 6/2019 | Lu et al. |
| 2019/0221973 | A1 | 7/2019 | Kirk et al. |
| 2019/0312389 | A1 | 10/2019 | Little |
| 2019/0334292 | A1 | 10/2019 | Cartier, Jr. et al. |
| 2020/0021052 | A1 | 1/2020 | Milbrand, Jr. et al. |
| 2020/0076132 | A1 | 3/2020 | Yang et al. |
| 2020/0161811 | A1 | 5/2020 | Lu |
| 2020/0194940 | A1 | 6/2020 | Cohen et al. |
| 2020/0212632 | A1* | 7/2020 | Liong .................. H01R 12/716 |
| 2020/0220289 | A1 | 7/2020 | Scholeno et al. |
| 2020/0235529 | A1 | 7/2020 | Kirk et al. |
| 2020/0251841 | A1 | 8/2020 | Stokoe et al. |
| 2020/0259294 | A1 | 8/2020 | Lu |
| 2020/0266584 | A1 | 8/2020 | Lu |
| 2020/0266585 | A1 | 8/2020 | Paniagua et al. |
| 2020/0315027 | A1 | 10/2020 | Muronoi et al. |
| 2020/0350717 | A1* | 11/2020 | Dong ................... H01R 13/112 |
| 2020/0350732 | A1* | 11/2020 | Hsueh .................... H01R 13/40 |
| 2020/0395698 | A1 | 12/2020 | Hou et al. |
| 2020/0403350 | A1 | 12/2020 | Hsu |
| 2020/0412060 | A1* | 12/2020 | Hsieh ................. H01R 13/6471 |
| 2021/0036465 | A1* | 2/2021 | Tang .................... H01R 12/721 |
| 2021/0050683 | A1 | 2/2021 | Sasame et al. |
| 2021/0159643 | A1 | 5/2021 | Kirk et al. |
| 2021/0175670 | A1 | 6/2021 | Cartier, Jr. et al. |
| 2021/0194187 | A1* | 6/2021 | Chen ........................ H01R 4/04 |
| 2021/0203096 | A1 | 7/2021 | Cohen |
| 2021/0234314 | A1 | 7/2021 | Johnescu et al. |
| 2021/0234315 | A1 | 7/2021 | Ellison et al. |
| 2021/0242632 | A1 | 8/2021 | Trout et al. |
| 2021/0320461 | A1 | 10/2021 | Buck et al. |
| 2021/0336362 | A1* | 10/2021 | Shen .................... H01R 12/716 |
| 2022/0102916 | A1 | 3/2022 | Liu et al. |
| 2022/0399663 | A1 | 12/2022 | Chang et al. |
| 2022/0407269 | A1 | 12/2022 | Ellison et al. |
| 2023/0062661 | A1 | 3/2023 | Johnescu et al. |
| 2023/0099389 | A1 | 3/2023 | Cohen |
| 2023/0128519 | A1 | 4/2023 | Kirk et al. |

FOREIGN PATENT DOCUMENTS

| | | | |
|---|---|---|---|
| CN | 1237652 | A | 12/1999 |
| CN | 1265470 | A | 9/2000 |
| CN | 2400938 | Y | 10/2000 |
| CN | 1276597 | A | 12/2000 |
| CN | 1280405 | A | 1/2001 |
| CN | 1299524 | A | 6/2001 |
| CN | 2513247 | Y | 9/2002 |
| CN | 2519434 | Y | 10/2002 |
| CN | 2519458 | Y | 10/2002 |
| CN | 2519592 | Y | 10/2002 |
| CN | 1394829 | A | 2/2003 |
| CN | 1398446 | A | 2/2003 |
| CN | 1401147 | A | 3/2003 |
| CN | 1471749 | A | 1/2004 |
| CN | 1489810 | A | 4/2004 |
| CN | 1491465 | A | 4/2004 |
| CN | 1502151 | A | 6/2004 |
| CN | 1516723 | A | 7/2004 |
| CN | 1179448 | C | 12/2004 |
| CN | 1561565 | A | 1/2005 |
| CN | 1203341 | C | 5/2005 |
| CN | 1639866 | A | 7/2005 |
| CN | 1650479 | A | 8/2005 |
| CN | 1764020 | A | 4/2006 |
| CN | 1799290 | A | 7/2006 |
| CN | 2798361 | Y | 7/2006 |
| CN | 2865050 | Y | 1/2007 |
| CN | 1985199 | A | 6/2007 |
| CN | 101032060 | A | 9/2007 |
| CN | 201000949 | Y | 1/2008 |
| CN | 101124697 | A | 2/2008 |
| CN | 101176389 | A | 5/2008 |
| CN | 101208837 | A | 6/2008 |
| CN | 101273501 | A | 9/2008 |
| CN | 201112782 | Y | 9/2008 |
| CN | 101312275 | A | 11/2008 |
| CN | 101316012 | A | 12/2008 |
| CN | 201222548 | Y | 4/2009 |
| CN | 201252183 | Y | 6/2009 |
| CN | 101552410 | A | 10/2009 |
| CN | 101600293 | A | 12/2009 |
| CN | 201374433 | Y | 12/2009 |
| CN | 101752700 | A | 6/2010 |
| CN | 101790818 | A | 7/2010 |
| CN | 101120490 | B | 11/2010 |
| CN | 101964463 | A | 2/2011 |
| CN | 101124697 | B | 3/2011 |
| CN | 201846527 | U | 5/2011 |
| CN | 102106041 | A | 6/2011 |
| CN | 102195173 | A | 9/2011 |
| CN | 102232259 | A | 11/2011 |
| CN | 102239605 | A | 11/2011 |
| CN | 102282731 | A | 12/2011 |
| CN | 102292881 | A | 12/2011 |
| CN | 101600293 | B | 5/2012 |
| CN | 102570100 | A | 7/2012 |
| CN | 102598430 | A | 7/2012 |
| CN | 101258649 | B | 9/2012 |
| CN | 102738621 | A | 10/2012 |
| CN | 102176586 | B | 11/2012 |
| CN | 102859805 | A | 1/2013 |
| CN | 202695788 | U | 1/2013 |
| CN | 202695861 | U | 1/2013 |
| CN | 102986091 | A | 3/2013 |
| CN | 103036081 | A | 4/2013 |
| CN | 103594871 | A | 2/2014 |
| CN | 204190038 | U | 3/2015 |
| CN | 104577577 | A | 4/2015 |
| CN | 205212085 | U | 5/2016 |
| CN | 102820589 | B | 8/2016 |
| CN | 106099546 | A | 11/2016 |
| CN | 107069274 | A | 8/2017 |
| CN | 107069293 | A | 8/2017 |
| CN | 304240766 | S | 8/2017 |
| CN | 304245430 | S | 8/2017 |
| CN | 206712089 | U | 12/2017 |
| CN | 207677189 | U | 7/2018 |

(56) References Cited

FOREIGN PATENT DOCUMENTS

| | | | |
|---|---|---|---|
| CN | 108832338 | A | 11/2018 |
| CN | 109994892 | A | 7/2019 |
| CN | 111555069 | A | 8/2020 |
| CN | 112134095 | A | 12/2020 |
| CN | 213636403 | U | 7/2021 |
| DE | 4109863 | A1 | 10/1992 |
| DE | 4238777 | A1 | 5/1993 |
| DE | 19853837 | C1 | 2/2000 |
| DE | 102006044479 | A1 | 5/2007 |
| DE | 60216728 | T2 | 11/2007 |
| EP | 0560551 | A1 | 9/1993 |
| EP | 0774807 | A2 | 5/1997 |
| EP | 0903816 | A2 | 3/1999 |
| EP | 1018784 | A1 | 7/2000 |
| EP | 1779472 | A1 | 5/2007 |
| EP | 1794845 | A1 | 6/2007 |
| EP | 2169770 | A2 | 3/2010 |
| EP | 2262061 | A1 | 12/2010 |
| EP | 2388867 | A2 | 11/2011 |
| EP | 2405537 | A1 | 1/2012 |
| EP | 1794845 | B1 | 3/2013 |
| GB | 1272347 | A | 4/1972 |
| GB | 2161658 | A | 1/1986 |
| GB | 2283620 | A | 5/1995 |
| HK | 1043254 | A1 | 9/2002 |
| JP | H05-54201 | A | 3/1993 |
| JP | H05-234642 | A | 9/1993 |
| JP | H07-57813 | A | 3/1995 |
| JP | H07-302649 | A | 11/1995 |
| JP | H09/63703 | A | 3/1997 |
| JP | H09-274969 | A | 10/1997 |
| JP | 2711601 | B2 | 2/1998 |
| JP | H11-67367 | A | 3/1999 |
| JP | 2896836 | B2 | 5/1999 |
| JP | H11-233200 | A | 8/1999 |
| JP | H11-260497 | A | 9/1999 |
| JP | 2000-013081 | A | 1/2000 |
| JP | 2000-311749 | A | 11/2000 |
| JP | 2001-068888 | A | 3/2001 |
| JP | 2001-510627 | A | 7/2001 |
| JP | 2001-217052 | A | 8/2001 |
| JP | 2002-042977 | A | 2/2002 |
| JP | 2002-053757 | A | 2/2002 |
| JP | 2002-075052 | A | 3/2002 |
| JP | 2002-075544 | A | 3/2002 |
| JP | 2002-117938 | A | 4/2002 |
| JP | 2002-246107 | A | 8/2002 |
| JP | 2003-017193 | A | 1/2003 |
| JP | 2003-309395 | A | 10/2003 |
| JP | 2004-192939 | A | 7/2004 |
| JP | 2004-259621 | A | 9/2004 |
| JP | 3679470 | B2 | 8/2005 |
| JP | 2006-344524 | A | 12/2006 |
| JP | 2008-515167 | A | 5/2008 |
| JP | 2009-043717 | A | 2/2009 |
| JP | 2009-110956 | A | 5/2009 |
| MX | 9907324 | A1 | 8/2000 |
| TW | 466650 | B | 12/2001 |
| TW | 517002 | B | 1/2003 |
| TW | 534494 | U | 5/2003 |
| TW | 200501874 | A | 1/2005 |
| TW | 200515773 | A | 5/2005 |
| TW | M274675 | U | 9/2005 |
| TW | M329891 | U | 4/2008 |
| TW | M357771 | U | 5/2009 |
| TW | 200926536 | A | 6/2009 |
| TW | M403141 | U | 5/2011 |
| TW | M494411 | U | 1/2015 |
| TW | I475770 | B | 3/2015 |
| TW | M509998 | U | 10/2015 |
| TW | M518837 | U | 3/2016 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M460138 | U | 5/2018 |
| TW | 201820724 | A | 6/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M623128 | U | 2/2022 |
| WO | WO 85/02265 | A1 | 5/1985 |
| WO | WO 88/05218 | A1 | 7/1988 |
| WO | WO 98/35409 | A1 | 8/1998 |
| WO | WO 01/39332 | A1 | 5/2001 |
| WO | WO 01/57963 | A2 | 8/2001 |
| WO | WO 2002/061892 | A1 | 8/2002 |
| WO | WO 03/013199 | A2 | 2/2003 |
| WO | WO 03/047049 | A1 | 6/2003 |
| WO | WO 2004/034539 | A1 | 4/2004 |
| WO | WO 2004/051809 | A2 | 6/2004 |
| WO | WO 2004/059794 | A2 | 7/2004 |
| WO | WO 2004/059801 | A1 | 7/2004 |
| WO | WO 2004/114465 | A2 | 12/2004 |
| WO | WO 2005/011062 | A2 | 2/2005 |
| WO | WO 2005/114274 | A1 | 12/2005 |
| WO | WO 2006/039277 | A1 | 4/2006 |
| WO | WO 2007/005597 | A2 | 1/2007 |
| WO | WO 2007/005598 | A2 | 1/2007 |
| WO | WO 2007/005599 | A1 | 1/2007 |
| WO | WO 2008/124052 | A2 | 10/2008 |
| WO | WO 2008/124054 | A2 | 10/2008 |
| WO | WO 2008/124057 | A2 | 10/2008 |
| WO | WO 2008/124101 | A2 | 10/2008 |
| WO | WO 2009/111283 | A2 | 9/2009 |
| WO | WO 2010/030622 | A1 | 3/2010 |
| WO | WO 2010/039188 | A1 | 4/2010 |
| WO | WO 2011/060236 | A1 | 5/2011 |
| WO | WO 2011/100740 | A2 | 8/2011 |
| WO | WO 2011/106572 | A2 | 9/2011 |
| WO | WO 2011/139946 | A1 | 11/2011 |
| WO | WO 2011/140438 | A2 | 11/2011 |
| WO | WO 2011/140438 | A3 | 12/2011 |
| WO | WO 2012/106554 | A2 | 8/2012 |
| WO | WO 2013/059317 | A1 | 4/2013 |
| WO | WO 2015/112717 | A1 | 7/2015 |
| WO | WO 2016/008473 | A1 | 1/2016 |
| WO | WO 2018/039164 | A1 | 3/2018 |

OTHER PUBLICATIONS

Chinese Invalidation Request dated Jun. 1, 2021 in connection with Chinese Application No. 2006800239976.

Chinese Invalidation Request dated Sep. 9, 2021 in connection with Chinese Application No. 201110008089.2.

Chinese Invalidation Request dated Jun. 15, 2021 in connection with Chinese Application No. 201180033750.3.

Chinese Supplemental Observations dated Jun. 17, 2021 in connection with Chinese Application No. 201210249710.9.

Chinese communication for Chinese Application No. 201580014851.4, dated Jun. 1, 2020.

Chinese Office Action for Chinese Application No. 201580014851.4 dated Sep. 4, 2019.

Chinese Invalidation Request dated Mar. 17, 2021 in connection with Chinese Application No. 201610952606.4.

Chinese Office Action for Chinese Application No. 201780064531.9 dated Jan. 2, 2020.

Chinese Office Action for Chinese Application No. 202010467444.1 dated Apr. 2, 2021.

Chinese Office Action for Chinese Application No. 202010825662.8 dated Sep. 3, 2021.

Chinese Office Action for Chinese Application No. 202010922401.8 dated Aug. 6, 2021.

Extended European Search Report for European Application No. EP 11166820.8 dated Jan. 24, 2012.

International Search Report and Written Opinion dated Dec. 28, 2021 in connection with International Application No. PCT/CN2021/119849.

(56) References Cited

OTHER PUBLICATIONS

International Preliminary Report on Patentability for International Application No. PCT/US2005/034605 dated Apr. 3, 2007.
International Search Report and Written Opinion for International Application No. PCT/US2005/034605 dated Jan. 26, 2006.
International Preliminary Report on Patentability for International Application No. PCT/US2006/025562 dated Jan. 9, 2008.
International Search Report with Written Opinion for International Application No. PCT/US2006/025562 dated Oct. 31, 2007.
International Preliminary Report on Patentability for International Application No. PCT/US2010/056482 dated May 24, 2012.
International Search Report and Written Opinion for International Application No. PCT/US2010/056482 dated Mar. 14, 2011.
International Preliminary Report on Patentability for International Application No. PCT/US2011/026139 dated Sep. 7, 2012.
International Search Report and Written Opinion for International Application No. PCT/US2011/026139 dated Nov. 22, 2011.
International Search Report and Written Opinion for International Application No. PCT/US2011/034747 dated Jul. 28, 2011.
International Preliminary Report on Patentability for International Application No. PCT/US2012/023689 dated Aug. 15, 2013.
International Search Report and Written Opinion for International Application No. PCT/US2012/023689 dated Sep. 12, 2012.
International Preliminary Report on Patentability for International Application No. PCT/US2012/060610 dated May 1, 2014.
International Search Report and Written Opinion for International Application No. PCT/US2012/060610 dated Mar. 29, 2013.
International Preliminary Report on Patentability for International Application No. PCT/US2015/012463 dated Aug. 4, 2016.
International Search Report and Written Opinion for International Application No. PCT/US2015/012463 dated May 13, 2015.
International Preliminary Report on Patentability for International Application No. PCT/US2017/047905, dated Mar. 7, 2019.
International Search Report and Written Opinion for International Application No. PCT/US2017/047905 dated Dec. 4, 2017.
International Preliminary Report on Patentability Chapter II dated Apr. 5, 2022 in connection with International Application No. PCT/US2021/015048.
International Search Report and Written Opinion dated Jul. 1, 2021 in connection with International Application No. PCT/US2021/015048.
International Preliminary Report on Patentability Chapter II dated Apr. 1, 2022 in connection with International Application No. PCT/US2021/015073.
International Search Report and Written Opinion dated May 17, 2021 in connection with International Application No. PCT/US2021/015073.
Taiwanese Office Action dated Mar. 5, 2021 in connection with Taiwanese Application No. 106128439.
Taiwanese Office Action dated Mar. 15, 2022 in connection with Taiwanese Application No. 110140608.
Decision Invalidating CN Patent Application No. 201610952606.4, which issued as CN Utility Model Patent No. 107069274B, and Certified Translation.
In re Certain Electrical Connectors and Cages, Components Thereof, and Prods. Containing the Same, Inv. No. 337-TA-1241, Order No. 31 (Oct. 19, 2021): Construing Certain Terms of the Asserted Claims of the Patents at Issue.
In re Matter of Certain Electrical Connectors and Cages, Components Thereof, and Products Containing the Same, Inv. No. 337-TA-1241, Complainant Amphenol Corporation's Corrected Initial Post-Hearing Brief. Public Version. Jan. 5, 2022. 451 pages.
In re Matter of Certain Electrical Connectors and Cages, Components Thereof, and Products Containing the Same, Inv. No. 337-TA-1241, Complainant Amphenol Corporation's Post-Hearing Reply Brief. Public Version. Dec. 6, 2021. 159 pages.
In re Matter of Certain Electrical Connectors and Cages, Components Thereof, and Products Containing the Same, Inv. No. 337-TA-1241, Luxshare Respondents' Initial Post-Hearing Brief. Public Version. Nov. 23, 2021. 348 pages.
In re Matter of Certain Electrical Connectors and Cages, Components Thereof, and Products Containing the Same, Inv. No. 337-TA-1241, Luxshare Respondents' Reply Post-Hearing Brief. Public Version. Dec. 6, 2021. 165 pages.
In re Matter of Certain Electrical Connectors and Cages, Components Thereof, and Products Containing the Same, Inv. No. 337-TA-1241, Notice of Prior Art. Jun. 3, 2021. 319 pages.
In re Matter of Certain Electrical Connectors and Cages, Components Thereof, and Products Containing the Same, Inv. No. 337-TA-1241, Respondents' Pre-Hearing Brief. Redacted. Oct. 21, 2021. 219 pages.
Invalidity Claim Charts Based on CN 201112782Y ("Cai"). Luxshare Respondents' Supplemental Responses to Interrogatories Nos. 13 and 14, Exhibit 25. May 7, 2021. 147 pages.
Invalidity Claim Charts Based on U.S. Pat. No. 6,179,651 ("Huang"). Luxshare Respondents' Supplemental Responses to Interrogatories Nos. 13 and 14, Exhibit 26. May 7, 2021. 153 pages.
Invalidity Claim Charts Based on U.S. Pat. No. 7,261,591 ("Korsunsky"). Luxshare Respondents' Supplemental Responses to Interrogatories Nos. 13 and 14, Exhibit 27. May 7, 2021. 150 pages.
Petition for Inter Partes Review. *Luxshare Precision Industry Co., Ltd* v. *Amphenol Corp*. U.S. Pat. No. 10,381,767. IPR2022-00132. Nov. 4, 2021. 112 pages.
[No. Author Listed], All About ESD Plastics. Evaluation Engineering. Jul. 1, 1998. 8 pages. https://www.evaluationengineering.com/home/article/13001136/all-about-esdplastics [last accessed Mar. 14, 2021].
[No Author Listed], AMP Incorporated Schematic, Cable Assay, 2 Pair, HMZD. Oct. 3, 2002. 1 page.
[No Author Listed], Board to Backplane Electrical Connector. The Engineer. Mar. 13, 2001, [last accessed Apr. 30, 2021]. 2 pages.
[No Author Listed], Borosil Vision Mezzo Mug Set of 2. Zola. 3 pages. https://www.zola.com/shop/product/borosil_vision_mezzao_mug_setof2_3.25. [date retrieved May 4, 2021].
[No Author Listed], Cable Systems. Samtec. Aug. 2010. 148 pages.
[No Author Listed], Carbon Nanotubes For Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013.
[No Author Listed], Coating Electrical Contacts. Brush Wellman Engineered Materials. Jan. 2002;4(1). 2 pages.
[No Author Listed], Common Management Interface Specification. Rev 4.0. MSA Group. May 8, 2019. 265 pages.
[No Author Listed], Electronics Connector Overview. FCI. Sep. 23, 2009. 78 pages.
[No Author Listed], EMI Shielding Compounds Instead of Metal. RTP Company. Last Accessed Apr. 30, 2021. 2 pages.
[No Author Listed], EMI Shielding Solutions and EMC Testing Services from Laird Technologies. Laird Technologies. Last acessed Apr. 30, 2021. 1 page.
[No Author Listed], EMI Shielding, Dramatic Cost Reductions for Electronic Device Protection. RTP. Jan. 2000. 10 pages.
[No Author Listed], Excerpt from The Concise Oxford Dictionary, Tenth Edition. 1999. 3 pages.
[No Author Listed], Excerpt from The Merriam-Webster Dictionary, Between. 2005. 4 pages.
[No Author Listed], Excerpt from Webster's Third New International Dictionary, Contact. 1986. 3 pages.
[No Author Listed], FCI—High Speed Interconnect Solutions, Backpanel Connectors. FCI. [last accessed Apr. 30, 2021). 2 pages.
[No Author Listed], General Product Specification for GbX Backplane and Daughtercard Interconnect System. Revision "B". Teradyne. Aug. 23, 2005. 12 pages.
[No Author Listed], High Speed Backplane Connectors. Tyco Electronics. Product Catalog No. 1773095. Revised Dec. 2008. 1-40 pages.
[No Author Listed], Hozox EMI Absorption Sheet and Tape. Molex. Laird Technologies. 2013. 2 pages.
[No Author Listed], INF-8074i Specification for SFP (Small Formfactor Pluggable) Transceiver. SFF Committee. Revision 1.0. May 12, 2001. 39 pages.

(56) References Cited

OTHER PUBLICATIONS

[No Author Listed], INF-8438i Specification for QSFP (Quad Small Formfactor Pluggable) Transceiver. Rev 1.0 Nov. 2006. SFF Committee. 76 pages.
[No Author Listed], Interconnect Signal Integrity Handbook. Samtec. Aug. 2007. 21 pages.
[No Author Listed], Metallized Conductive Products: Fabric-Over-Foam, Conductive Foam, Fabric, Tape. Laird Technologies. 2003. 32 pages.
[No Author Listed], Metral® 2000 Series. FCI. 2001. 2 pages.
[No Author Listed], Metral® 2mm High-Speed Connectors 1000, 2000, 3000 Series. FCI. 2000. 119 pages.
[No Author Listed], Metral® 3000 Series. FCI. 2001. 2 pages.
[No Author Listed], Metral® 4000 Series. FCI. 2002. 2 pages.
[No Author Listed], Metral® 4000 Series: High-Speed Backplane Connectors. FCI, Rev. 3. Nov. 30, 2001. 21 pages.
[No Author Listed], Military Fibre Channel High Speed Cable Assembly. www.gore.com. 2008. [last accessed Aug. 2, 2012 via Internet Archive: Wayback Machine http://web.archive.org] Link archived: http://www.gore.com/en.sub.--xx/products/cables/copper/networking/militar-y/military.sub.--fibre . . . Last archive date Apr. 6, 2008.
[No Author Listed], Molex Connectors as InfiniBand Solutions. Design World. Nov. 19, 2008. 7 pages. https://www.designworldonline.com/molex-connectors-as-infiniband-solutions/. [last accessed May 3, 2021].
[No Author Listed], OSFP MSA Specification for OSFP Octal Small Form Factor Pluggable Module. Revision 1.11. OSFP MSA. Jun. 26, 2017. 53 pages.
[No Author Listed], OSFP MSA Specification for OSFP Octal Small Form Factor Pluggable Module. Revision 1.12. OSFP MSA. Aug. 1, 2017. 53 pages.
[No Author Listed], OSFP MSA Specification for OSFP Octal Small Form Factor Pluggable Module. Revision 2.0 OSFP MSA. Jan. 14, 2019. 80 pages.
[No Author Listed], OSFP MSA Specification for OSFP Octal Small Form Factor Pluggable Module. Revision 3.0 OSFP MSA. Mar. 14, 2020. 99 pages.
[No Author Listed], Photograph of Molex Connector. Oct. 2021. 1 page.
[No Author Listed], Photograph of TE Connector. Oct. 2021. 1 page.
[No Author Listed], Pluggable Form Products. Tyco Electronics. Mar. 5, 2006. 1 page.
[No Author Listed], Pluggable Input/Output Solutions. Tyco Electronics Catalog 1773408-1. Revised Feb. 2009. 40 pages.
[No Author Listed], QSFP Market Evolves, First Products Emerge. Lightwave. Jan. 22, 2008. pp. 1-8. https://www.lightwaveonline.com/home/article/16662662.
[No Author Listed], QSFP-DD Hardware Specification for QSFP Double Density 8X Pluggable Transceiver, Rev 3.0. QSFP-DD MSA. Sep. 19, 2017. 69 pages.
[No Author Listed], QSFP-DD Hardware Specification for QSFP Double Density 8X Pluggable Transceiver, Rev 4.0. QSFP-DD MSA. Sep. 18, 2018. 68 pages.
[No Author Listed], QSFP-DD MSA QSFP-DD Hardware Specification for QSFP Double Density 8X Pluggable Transceiever. Revision 5.0. QSFP-DD-MSA. Jul. 9, 2019. 82 pages.
[No Author Listed], QSFP-DD MSA QSFP-DD Hardware Specification for QSFP Double Density 8X Pluggable Transceiver. Revision 5.1. QSFP-DD MSA. Aug. 7, 2020. 84 pages.
[No Author Listed], QSFP-DD MSA QSFP-DD Specification for QSFP Double Density 8X Pluggable Transceiver. Revision 1.0. QSFP-DD-MSA. Sep. 15, 2016. 69 pages.
[No Author Listed], QSFP-DD Specification for QSFP Double Density 8X Pluggable Transceiver Specification, Rev. 2.0. QSFP-DD MSA. Mar. 13, 2017. 106 pages.
[No Author Listed], RTP Company Introduces "Smart" Plastics for Bluetooth Standard. Press Release. RTP. Jun. 4, 2001. 2 pages.
[No Author Listed], RTP Company Specialty Compounds. RTP. Mar. 2002. 2 pages.
[No Author Listed], RTP Company-EMI/RFI Shielding Compounds (Conductive) Data Sheets. RTP Company. Last accessed Apr. 30, 20210. 4 pages.
[No Author Listed], Samtec Board Interface Guide. Oct. 2002. 253 pages.
[No Author Listed], SFF Committee SFF-8079 Specification for SFP Rate and Application Selection. Revision 1.7. SFF Committee. Feb. 2, 2005. 21 pages.
[No Author Listed], SFF Committee SFF-8089 Specification for SFP (Small Formfactor Pluggable) Rate and Application Codes. Revision 1.3. SFF Committee. Feb. 3, 2005. 18 pages.
[No Author Listed], SFF Committee SFF-8436 Specification for QSFP+ 4X 10 Gb/s Pluggable Transceiver. Revision 4.9. SFF Committee. Aug. 31, 2018. 88 pages.
[No Author Listed], SFF Committee SFF-8665 Specification for QSFP+ 28 Gb/s 4X Pluggable Transceiver Solution (QSFP28). Revision 1.9. SFF Committee. Jun. 29, 2015. 14 pages.
[No Author Listed], SFF-8075 Specification for PCI Card Version of SFP Cage. Rev 1.0. SFF Committee. Jul. 3, 2001. 11 pages.
[No Author Listed], SFF-8431 Specifications for Enhanced Small Form Factor Pluggable Module SFP+. Revision 4.1. SFF Committee. Jul. 6, 2009. 132 pages.
[No Author Listed], SFF-8432 Specification for SFP+ Module and Cage. Rev 5.1. SFF Committee. Aug. 8, 2012. 18 pages.
[No Author Listed], SFF-8433 Specification for SFP+ Ganged Cage Footprints and Bezel Openings. Rev 0.7. SFF Committee. Jun. 5, 2009. 15 pages.
[No Author Listed], SFF-8477 Specification for Tunable XFP for ITU Frequency Grid Applications. Rev 1.4. SFF Committee. Dec. 4, 2009. 13 pages.
[No Author Listed], SFF-8672 Specification for QSFP+ 4x 28 Gb/s Connector (Style B). Revision 1.2. SNIA. Jun. 8, 2018. 21 pages.
[No Author Listed], SFF-8679 Specification for QSFP+ 4X Base Electrical Specification. Rev 1.7. SFF Committee. Aug. 12, 2014. 31 pages.
[No Author Listed], SFF-8682 Specification for QSFP+ 4X Connector. Rev 1.1. SNIA SFF TWG Technology Affiliate. Jun. 8, 2018. 19 pages.
[No Author Listed], Shielding Theory and Design. Laird Technologies. Last accessed Apr. 30, 2021. 1 page.
[No Author Listed], Shielding Theory and Design. Laird Technologies. Last accessed Apr. 30, 2021. 2 pages. URL:web.archive.org/web/20030226182710/http://www.lairdtech.com/catalog/staticdata/shieldingtheorydesign/std_3.htm.
[No Author Listed], Shielding Theory and Design. Laird Technologies. Last accessed Apr. 30, 2021. 2 pages. URL:web.archive.org/web/20021223144443/http://www.lairdtech.com/catalog/staticdata/shieldingtheorydesign/std_2.htm.
[No Author Listed], Signal Integrity—Multi-Gigabit Transmission Over Backplane Systems. International Engineering Consortium. 2003;1-8.
[No Author Listed], Signal Integrity Considerations for 10Gbps Transmission over Backplane Systems. DesignCon2001. Teradyne Connections Systems, Inc. 2001. 47 pages.
[No Author Listed], Specification for OSFP Octal Small Form Factor Pluggable Module. Rev 1.0. OSFP MSA. Mar. 17, 2017. 53 pages.
[No Author Listed], TB-2092 GbX Backplane Signal and Power Connector Press-Fit Installation Process. Teradyne. Aug. 8, 2002;1-9.
[No Author Listed], Teradyne Beefs Up High-Speed GbX Connector Platform. EE Times. Sep. 20, 2005. 3 pages.
[No Author Listed], Teradyne Connection Systems Introduces the GbX L-Series Connector. Press Release. Teradyne. Mar. 22, 2004. 5 pages.
[No Author Listed], Teradyne Schematic, Daughtercard Connector Assembly 5 Pair GbX, Drawing No. C-163-5101-500. Nov. 6, 2002. 1 page.
[No Author Listed], Tin as a Coating Material. Brush Wellman Engineered Materials. Jan. 2002;4(2). 2 pages.
[No Author Listed], Two and Four Pair HM-Zd Connectors. Tyco Electronics. Oct. 14, 2003;1-8.

(56) References Cited

OTHER PUBLICATIONS

[No Author Listed], Tyco Electronics Schematic, Header Assembly, Right Angle, 4 Pair HMZd, Drawing No. C-1469048. Jan. 10, 2002. 1 page.
[No Author Listed], Tyco Electronics Schematic, Receptacle Assembly, 2 Pair 25mm HMZd, Drawing No. C-1469028. Apr. 24, 2002. 1 page.
[No Author Listed], Tyco Electronics Schematic, Receptacle Assembly, 3 Pair 25mm HMZd, Drawing No. C1469081. May 13, 2002. 1 page.
[No Author Listed], Tyco Electronics Schematic, Receptacle Assembly, 4 Pair HMZd, Drawing No. C1469001. Apr. 23, 2002. 1 page.
[No Author Listed], Tyco Electronics Z-Dok+ Connector. May 23, 2003. pp. 1-15. http://zdok.tycoelectronics.com.
[No Author Listed], Tyco Electronics, SFP System. Small Form-Factor Pluggable (SFP) System. Feb. 2001. 1 page.
[No Author Listed], Typical conductive additives—Conductive Compounds. RTP Company. https://www.rtpcompany.com/products/conductive/additives.htm. Last accessed Apr. 30, 2021. 2 pages.
[No Author Listed], Z-Pack HM-Zd Connector, High Speed Backplane Connectors. Tyco Electronics. Catalog 1773095. 2009;5-44.
[No Author Listed], Z-Pack HM-Zd: Connector Noise Analysis for XAUI Applications. Tyco Electronics. Jul. 9, 2001. 19 pages.
Atkinson et al., High Frequency Electrical Connector, U.S. Appl. No. 15/645,931, filed Jul. 10, 2017.
Beaman, High Performance Mainframe Computer Cables. 1997 Electronic Components and Technology Conference. 1997;911-7.
Chung, Electrical applications of carbon materials. J. of Materials Science. 2004;39:2645-61.
Dahman, Recent Innovations of Inherently Conducting Polymers for Optimal (106-109 Ohm/Sq) ESD Protection Materials. RTD Company. 2001. 8 pages.
Do et al., A Novel Concept Utilizing Conductive Polymers on Power Connectors During Hot Swapping in Live Modular Electronic Systems. IEEE Xplore 2005; downloaded Feb. 18, 2021;340-345.
Eckardt, Co-Injection Charting New Territory and Opening New Markets. Battenfeld GmbH. Journal of Cellular Plastics. 1987;23:555-92.
Elco, Metral® High Bandwidth—A Differential Pair Connector for Applications up to 6 GHz. FCI. Apr. 26, 1999;1-5.
Feller et al., Conductive polymer composites: comparative study of poly(ester)-short carbon fibres and poly(epoxy)-short carbon fibres mechanical and electrical properties. Materials Letters. Feb. 21, 2002;57:64-71.
Getz et al., Understanding and Eliminating EMI in Microcontroller Applications. National Semiconductor Corporation. Aug. 1996. 30 pages.
Grimes et al., A Brief Discussion of EMI Shielding Materials. IEEE. 1993:217-26.
Housden et al., Moulded Interconnect Devices. Prime Faraday Technology Watch. Feb. 2002. 34 pages.
McAlexander, CV of Joseph C. McAlexander III . Exhibit 1009. 2021. 31 pages.
McAlexander, Declaration of Joseph C. McAlexander III in Support of Petition for Inter Partes Review of U.S. Pat. No. 10,381,767. Exhibit 1002. Nov. 4, 2021. 85 pages.
Nadolny et al., Optimizing Connector Selection for Gigabit Signal Speeds. Sep. 2000. 5 pages.
Neelakanta, Handbook of Electromagnetic Materials: Monolithic and Composite Versions and Their Applications. CRC. 1995. 246 pages.
Okinaka, Significance of Inclusions in Electroplated Gold Films for Electronics Applications. Gold Bulletin. Aug. 2000;33(4):117-127.
Ott, Noise Reduction Techniques In Electronic Systems. Wiley. Second Edition. 1988. 124 pages.
Patel et al., Designing 3.125 Gbps Backplane System. Teradyne. 2002. 58 pages.
Preusse, Insert Molding vs. Post Molding Assembly Operations. Society of Manufacturing Engineers. 1998. 8 pages.
Reich et al., Microwave Theory and Techniques. Boston Technical Publishers, Inc. 1965;182-91.
Ross, Focus on Interconnect: Backplanes Get Reference Designs. EE Times. Oct. 27, 2003 [last accessed Apr. 30, 2021]. 4 pages.
Ross, GbX Backplane Demonstrator Helps System Designers Test High-Speed Backplanes. EE Times. Jan. 27, 2004 [last accessed May 5, 2021]. 3 pages.
Shi et al. Improving Signal Integrity in Circuit Boards by Incorporating Absorbing Materials. 2001 Proceedings. 51st Electronic Components and Technology Conference, Orlando FL. 2001:1451-56.
Silva et al., Conducting Materials Based on Epoxy/Graphene Nanoplatelet Composites With Microwave Absorbing Properties: Effect of the Processing Conditions and Ionic Liquid. Frontiers in Materials. Jul. 2019;6(156):1-9. doi: 10.3389/fmats.2019.00156.
Tracy, Rev. 3.0 Specification IP (Intellectual Property). Mar. 20, 2020. 8 pages.
Violette et al., Electromagnetic Compatibility Handbook. Van Nostrand Reinhold Company Inc. 1987. 229 pages.
Wagner et al., Recommended Engineering Practice to Enhance the EMI/EMP Immunity of Electric Power Systems. Electric Research and Management, Inc. Dec. 1992. 209 pages.
Weishalla, Smart Plastic for Bluetooth. RTP Imagineering Plastics. Apr. 2001. 7 pages.
White, A Handbook on Electromagnetic Shielding Materials and Performance. Don Whie Consultants. 1998. Second Edition. 77 pages.
White, EMI Control Methodology and Procedures. Don White Consultants, Inc. Third Edition 1982. 22 pages.
Williams et al., Measurement of Transmission and Reflection of Conductive Lossy Polymers at Millimeter-Wave Frequencies. IEEE Transactions on Electromagnetic Compatibility. Aug. 1990;32(3):236-240.
U.S. Appl. No. 16/518,362, filed Jan. 16, 2020, Milbrand, Jr. et al.
U.S. Appl. No. 16/795,398, filed Feb. 19, 2020, Paniagua et al.
U.S. Appl. No. 17/102,133, filed Nov. 23, 2020, Cartier et al.
U.S. Appl. No. 17/158,214, filed Jan. 26, 2021, Johnescu et al.
U.S. Appl. No. 17/158,543, filed Jan. 26, 2021, Ellison et al.
U.S. Appl. No. 17/164,400, filed Feb. 1, 2021, Kirk et al.
U.S. Appl. No. 17/181,639, filed Feb. 22, 2021, Cohen.
U.S. Appl. No. 17/477,352, filed Sep. 16, 2021, Liu et al.
CN 200580040906.5, Aug. 17, 2021, Chinese Invalidation Request.
CN 200680023997.6, Jun. 1, 2021, Chinese Invalidation Request.
CN 201110008089.2, Sep. 9, 2021, Chinese Invalidation Request.
CN 201180033750.3, Jun. 15, 2021, Chinese Invalidation Request.
CN 201210249710.9, Jun. 17, 2021, Jun. 17, 2021, Chinese Supplemental Observations.
CN 201580014851.4, Jun. 1, 2020, Chinese communication.
CN 201580014851.4, Sep. 4, 2019, Chinese Office Action.
CN 201610952606.4, Mar. 17, 2021, Chinese Invalidation Request.
CN 201780064531.9, Jan. 2, 2020, Chinese Office Action.
CN 202010467444.1, Apr. 2, 2021, Chinese Office Action.
CN 202010825662.8, Sep. 3, 2021, Chinese Office Action.
CN 202010922401.8, Aug. 6, 2021, Chinese Office Action.
EP 111668208, Jan. 24, 2012, Extended European Search Report.
PCT/CN2021/119849, Dec. 28, 2021, International Search Report and Written Opinion.
PCT/US2005/034605, Apr. 3, 2007, International Preliminary Report on Patentability.
PCT/US2005/034605, Jan. 26, 2006, International Search Report and Written Opinion.
PCT/US2006/025562, Jan. 9, 2008, International Preliminary Report on Patentability.
PCT/US2006/025562, Oct. 31, 3007, International Search Report with Written Opinion.
PCT/US2010/056482, May 24, 2012, International Preliminary Report on Patentability.
PCT/US2010/056482, Mar. 14, 2011, International Search Report and Written Opinion.
PCT/US2011/026139, Sep. 7, 2012, International Preliminary Report on Patentability.
PCT/US2011/026139, Nov. 22, 2011, International Search Report and Written Opinion.

(56) References Cited

OTHER PUBLICATIONS

PCT/US2011/034747, Jul. 28, 2011, International Search Report and Written Opinion.
PCT/US2012/023689, Aug. 15, 2013, International Preliminary Report on Patentability.
PCT/US2012/023689, Sep. 12, 2012, International Search Report and Written Opinion.
PCT/US2012/060610, May 1, 2014, International Preliminary Report on Patentability.
PCT/US2012/060610, Mar. 29, 2013, International Search Report and Written Opinion.
PCT/US2015/012463, Aug. 4, 2016, International Preliminary Report on Patentability.
PCT/US2015/012463, May 13, 2015, International Search Report and Written Opinion.
PCT/US2017/047905, Mar. 7, 2019, International Preliminary Report on Patentability.
PCT/US2017/047905, Dec. 4, 2017, International Search Report and Written Opinion.
PCT/US2021/015048, Apr. 5, 2022, International Preliminary Report on Patentability Chapter II.
PCT/US2021/015048, Jul. 1, 2021, International Search Report and Written Opinion.
PCT/US2021/015073, Apr. 1, 2022, International Preliminary Report on Patentability Chapter II.
PCT/US2021/015073, May 17, 2021, International Search Report and Written Opinion.
TW 106128439, Mar. 5, 2021, Taiwanese Office Action.
TW 110140608, Mar. 15, 2022, Taiwanese Office Action.
U.S. Appl. No. 18/075,313, filed Dec. 5, 2022, Cohen.
U.S. Appl. No. 18/085,093, filed Dec. 20, 2022, Kirk et al.
U.S. Appl. No. 18/318,890, filed May 17, 2023, Zeng.
U.S. Appl. No. 18/335,472, filed Jun. 15, 2023, Cartier et al.
U.S. Appl. No. 18/449,520, filed Aug. 14, 2023, Milbrand et al.
U.S. Appl. No. 18/465,351, filed Sep. 12, 2023, Johnescu et al.
In the Matter of Certain Electrical Connectors and Cages, Components Thereof, and Products Containing the Same, Inv. No. 337-TA-1241, Final Initial Determination on Violation of Section 337. Public Version. March 11, 2022. 393 pages.
Cartier et al., High Speed, High Density Electrical Connector With Shielded Signal Paths, U.S. Appl. No. 18/335,472, filed Jun. 15, 2023.
Johnescu et al., High Speed Connector, U.S. Appl. No. 18/465,351, filed Sep. 12, 2023.
Milbrand et al., High Performance Cable Connector, U.S. Appl. No. 18/449,520, filed Aug. 14, 2023.
Zeng, High Speed Electrical Connector With High Manufacturing Tolerance, U.S. Appl. No. 18/318,890, filed May 17, 2023.

* cited by examiner

HIGH SPEED ELECTRICAL CONNECTOR

RELATED APPLICATIONS

This application claims priority to and the benefit of Chinese Patent Application Serial No. 202120186566.3, filed on Jan. 22, 2021. This application also claims priority to and the benefit of Chinese Patent Application Serial No. 202022110410.5, filed on Sep. 22, 2020. The entire contents of these applications are incorporated herein by reference in their entirety.

FIELD

This application relates generally to electrical connectors, such as those used to interconnect electronic assemblies.

BACKGROUND

Electrical connectors are used in many electronic systems. It is generally easier and more cost effective to manufacture a system as separate electronic assemblies, such as printed circuit boards ("PCBs"), which may be joined together with electrical connectors. A known arrangement for joining several PCBs is to have one PCB serve as a backplane. Other PCBs, called "daughterboards" or "daughtercards", may be connected through the backplane.

A known backplane is a PCB onto which many connectors may be mounted. Conducting traces in the backplane may be electrically connected to signal conductors in the connectors so that signals may be routed between the connectors. Signals may be routed among daughtercards through the connectors and the backplane. For example, daughtercards may also have connectors mounted thereon. The connectors mounted on a daughtercard may be plugged into the connectors mounted on the backplane.

In another know arrangement, a PCB may serve as a motherboard to which other PCBs may be attached. This configuration is often used in computers in which the mother board might be implemented with a processor and a bus configured to pass data between the processor and peripherals, such as a graphics processor or memory. Connectors may be mounted to the motherboard and connected to the bus. The peripherals may he implemented on separate PCBs with connectors that mate with the connectors on the bus such that separately manufactured peripherals may be readily integrated into a computer made with the motherboard.

To enhance the availability of peripherals, the bus and the connectors used to physically connect peripherals via the bus may be standardized. In this way, there may be a large number of peripherals available from a multitude of manufacturers. All of those products, so long as they are compliant with the standard, may be used in a computer that has a bus compliant with the standard. An example of such a standard is PCIe, which is commonly used within computers.

The PCIe standard has gone through multiple revisions, adapting to the higher performance expected from computers over time. It may be desirable for each version of the standard to be backwards compatible with prior versions. For example, PCIe 5.0 is backwards compatible with PCIe 4.0, meaning that a computer with a bus manufactured according to PCIe 5.0 can operate with peripherals manufactured according to PCIe 4.0, and vice versa. Such compatibility requires a PCIe 5.0 connector to have the same form factor as a connector manufactured according to PCIe 4.0 so that physical compatibility can be provided across versions. However, the connector manufactured according to PCIe 5.0 must pass signals at higher data rates than is required for a connector designed for use in a PCIe 4.0 system. This has led to connector manufacturers offering different products for different versions of the standard.

BRIEF SUMMARY

Aspects of the present disclosure relate to high speed electrical connectors.

Some embodiments relate to an electrical connector. The electrical connector may include a plurality of conductors each comprising a mating contact portion, a contact tail, and an intermediate portion extending between the mating contact portion and the contact tail; and a housing holding the plurality of conductors, the housing comprising a mounting face that the contact tails of the plurality of conductors extend therethrough, the mounting face comprising a slot.

In some embodiments, the housing may include a first segment and a second segment spaced apart along a longitudinal direction. The plurality of conductors may include a plurality of first signal conductors, a plurality of first ground conductors, and a plurality of second signal conductors. The plurality of first signal conductors, the plurality of first ground conductors, and the slot may be located in the first segment. The plurality of second signal conductors may be located in the second segment.

In some embodiments, the electrical connector may include a member disposed in the slot and electrically coupled with the plurality of first ground conductors.

In some embodiments, the member may abut against the plurality of first ground conductors.

In some embodiments, the slot may expose portions of the intermediate portions of the plurality of conductors.

In some embodiments, the slot may include a main opening elongated along the longitudinal direction and a plurality of branch openings extending from a side of the main opening along a transverse direction perpendicular to the longitudinal direction. The plurality of branch openings may expose portions of the intermediate portions of the plurality of first signal conductors and the plurality of first ground conductors, respectively.

In some embodiments, the plurality of conductors may be arranged in two columns extending along a longitudinal direction. The slot may be located between the two columns. The two columns may be offset from each other a predetermined distance along the longitudinal direction.

In some embodiments, the predetermined distance may be equal to half of the spacing between longitudinally adjacent conductors in the first segment.

In some embodiments, the electrical connector may be a plug electrical connector.

In some embodiments, the electrical connector may include a member disposed in the slot. The member may be insulative or lossy.

In some embodiments, the housing may include a first segment that the slot is aligned herewith, a second segment separate from the first segment, and a member disposed in the slot to combine with a surface of the first segment of the housing to create a mounting face. The second segment of the housing may have a surface defining the mounting face without an insert.

Some embodiments relate to an electrical connector. The electrical connector may include a plurality of conductors comprising a plurality of first signal conductors, a plurality of first ground conductors, and a plurality of second signal conductors; and a housing comprising a first segment and a second segment spaced apart along a longitudinal direction, the first segment holding the plurality of first signal conductor and the plurality of first ground conductors, the second segment holding the plurality of second signal conductors, the first segment comprising a member electrically coupled with the plurality of first ground conductors.

In some embodiments, the housing may include a slot. The member may be accommodated in the slot.

In some embodiments, the member may be lossy.

In some embodiments, the plurality of first signal conductors and the plurality of first ground conductors may be arranged in two columns in the first segment and extending along the longitudinal direction. The two columns may be offset from each other by a predetermined distance along the longitudinal direction.

In some embodiments, the predetermined distance may be equal to half of the spacing between longitudinally adjacent conductors in the first segment.

In some embodiments, the plurality of conductors each may include a mating contact portion, a contact tail, and an intermediate portion extending between the mating contact portion and the contact tail. The slot may expose portions of the intermediate portions of the plurality of conductors in the first segment.

In some embodiments, the slot may include a main opening elongated along the longitudinal direction and a plurality of branch openings extending from a side of the main opening along a transverse direction perpendicular to the longitudinal direction. The plurality of branch openings may expose portions of the intermediate portions of the plurality of first signal conductors and the plurality of first ground conductors, respectively.

In some embodiments, each of the first and second segments may include a tongue. The plurality of conductors may extend through the housing with tails exposed at a mounting face and mating contact portions embedded in a respective tongue.

Some embodiments relate to an electrical connector. The electrical connector may include a plurality of conductors each comprising a mating contact portion, a contact tail, and an intermediate portion extending between the mating contact portion and the contact tail, the plurality of conductors comprising a plurality of first signal conductors, a plurality of first ground conductors, and a plurality of second signal conductors; a housing comprising a first segment and a second segment spaced apart along a longitudinal direction, and a mounting face that the contact tails of the plurality of conductors extend therethrough, the mounting face comprising a slot aligned with the first segment, the first segment comprising a first tongue and holding the plurality of first signal conductors and the plurality of first ground conductors with the mating contact portions of the first signal conductors and first ground conductors embedded in the first tongue, the second segment comprising a second tongue and holding the plurality of second signal conductors with the mating contact portions of the second signal conductors embedded in the second tongue; and a member disposed in the slot and electrically coupled with the plurality of first ground conductors. The member may combine with a surface of the first segment of the housing to create the mounting face. The second segment of the housing may have a surface defining the mounting face without an insert.

Some embodiments relate to an electrical connector. The electrical connector may include an insulating housing and a plurality of conductors. A back side of the insulating housing may be provided with a slot. The plurality of conductors may be arranged in the insulating housing, the plurality of conductors may be arranged along a longitudinal direction, and the plurality of conductors may include a plurality of first signal conductors and a plurality of first ground conductors. A front side of the insulating housing may expose the plurality of conductors, the slot may expose the plurality of first ground conductors, and the slot may be used to receive a member.

In some embodiments, the insulating housing may include a first segment and a second segment, and the first segment and the second segment may be spaced apart along the longitudinal direction. The plurality of first signal conductors, the plurality of first ground conductors and the slot may be located in the first segment. The plurality of conductors further may include a plurality of second signal conductors, and the plurality of second signal conductors may be located in the second segment.

In some embodiments, the member may include a conductive plastic member, and the conductive plastic member may be electrically coupled with the plurality of first ground conductors.

In some embodiments, the member may include an insulating member, and the insulating member may abut against the plurality of first ground conductors.

In some embodiments, the slot may expose the plurality of first signal conductors.

In some embodiments, the slot may include an elongated main opening and a plurality of branch openings extending from a side of the main opening along a transverse direction, and the plurality of branch openings may expose the plurality of first signal conductors and the plurality of first ground conductors respectively.

In sonic embodiments, the plurality of conductors may be arranged in two columns extending along the longitudinal direction, the slot may be located between the two columns along a transverse direction, and the two columns may be offset from each other a predetermined distance along the longitudinal direction.

In some embodiments, the predetermined distance may be equal to half of the spacing between longitudinally adjacent conductors in the first segment.

In some embodiments, the electrical connector may be a plug electrical connector.

Some embodiments relate to an electrical connector. The electrical connector may include an insulating housing, a plurality of conductors and a conductive plastic member. The insulating housing may have a first segment and a second segment, and the first segment and the second segment may be spaced apart along a longitudinal direction. The plurality of conductors may be arranged in the insulating housing, and the plurality of conductors may be arranged along the longitudinal direction. The plurality of conductors may comprise a plurality of first signal conductors, a plurality of first ground conductors and a plurality of second signal conductors. The plurality of first signal conductors and the plurality of first ground conductors may be located in the first segment, and the plurality of second signal conductors may be located in the second segment. A front side of the insulating housing may expose the plurality of conductors. The conductive plastic member may be arranged in the first segment, and the conductive plastic member may be electrically coupled with the plurality of first ground conductors.

In some embodiments, a back side of the insulating housing may be provided with a slot, and the conductive plastic member may be accommodated in the slot.

In some embodiments, the plurality of conductors in the first segment may be arranged in two columns extending along the longitudinal direction, the slot may be located between the two columns along a transverse direction, and the two columns may be offset from each other a predetermined distance along the longitudinal direction.

These techniques may be used alone or in any suitable combination. The foregoing summary is provided by way of illustration and is not intended to be limiting.

BRIEF DESCRIPTION OF DRAWINGS

The following accompanying drawings of the present disclosure are used here as a part of the present disclosure for understanding the present disclosure. The accompanying drawings are not intended to be drawn to scale. For purposes of clarity, not every component may be labeled in every drawing. In the drawings.

Figure 1:
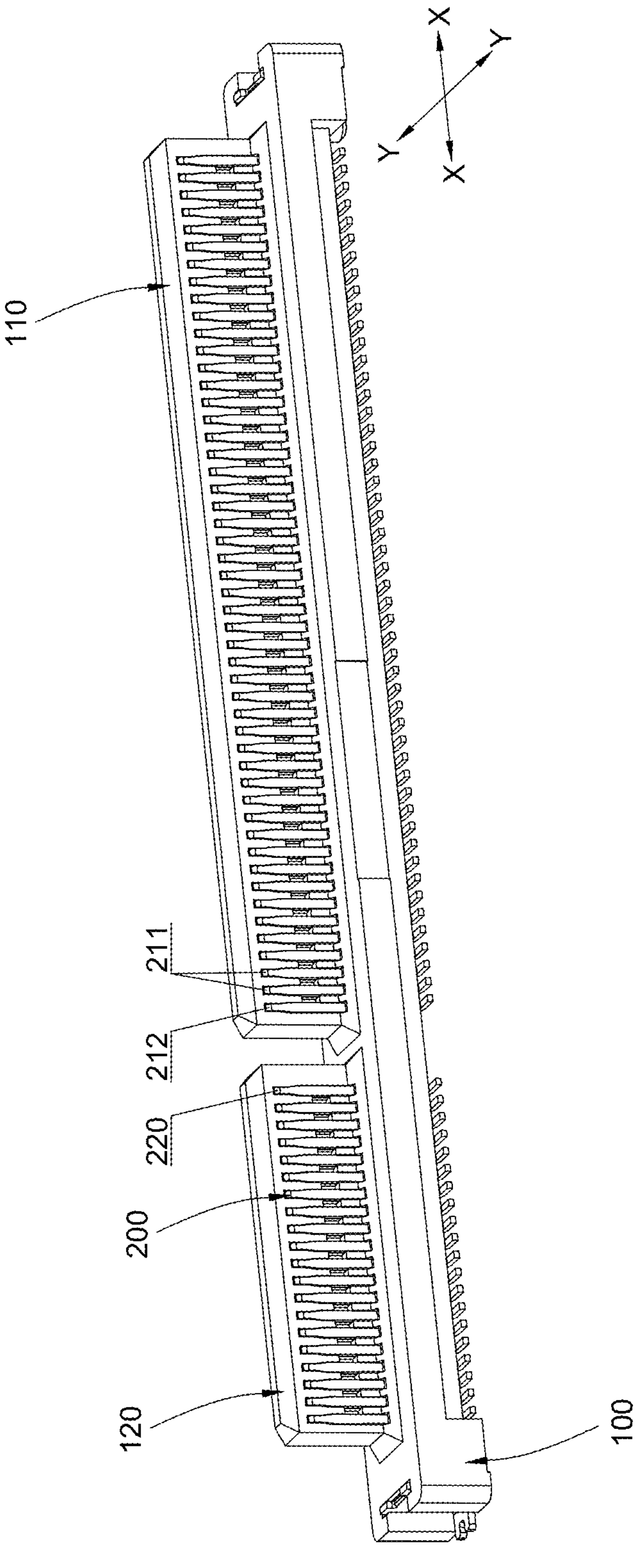
FIG. 1 is a perspective view of an electrical connector, according to some embodiments.
Figure 2:
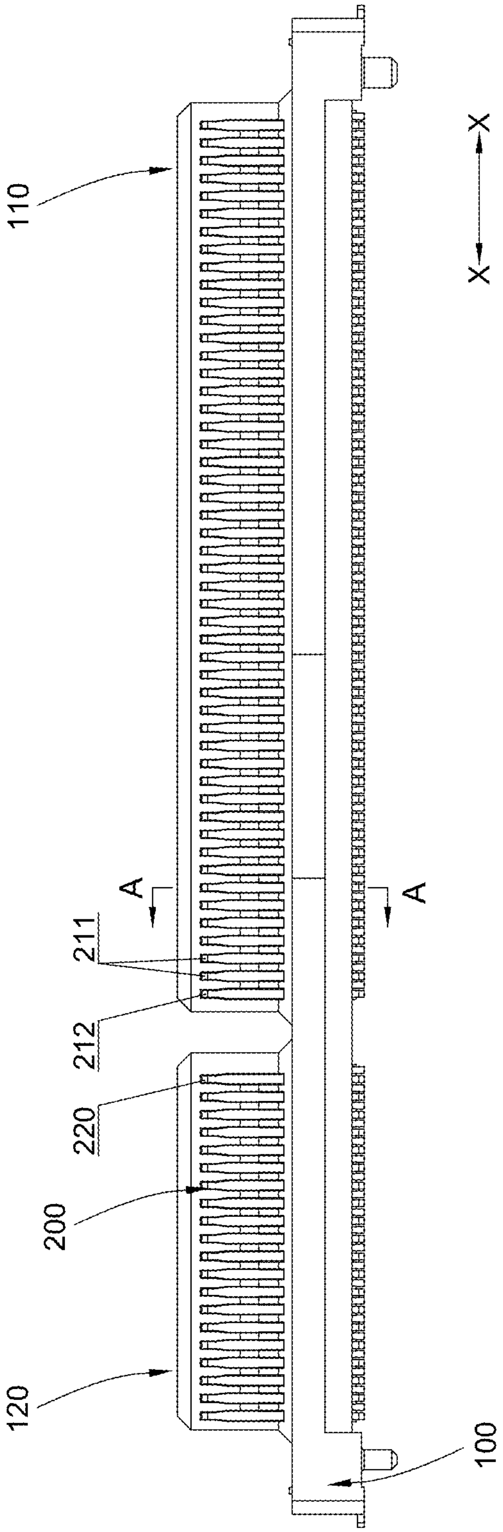
FIG. 2 is a front plan view of the electrical connector shown in FIG. 1.
Figure 3:
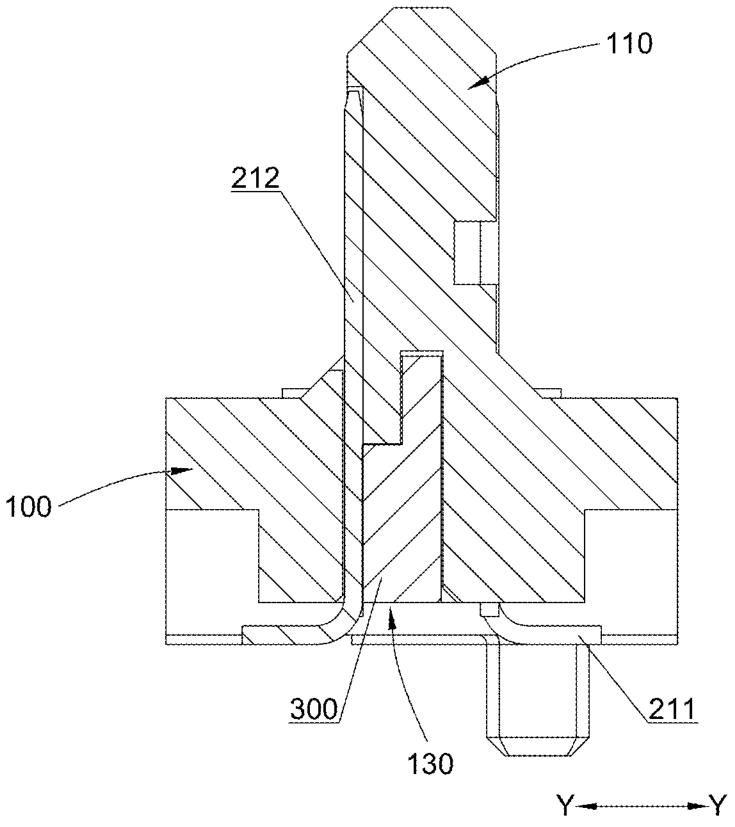
FIG. 3 is a cross-sectional view of the electrical connector shown in FIG. 2 along the line marked "A-A" in FIG. 2.

The accompanying drawings include the following reference numerals:

100, insulating housing; 102, conductor installation groove; 110, first segment; 120, second segment; 130, slot; 131, main opening; 132, branch opening; 200, conductor; 211, first signal conductor; 212, first ground conductor; 220, second signal conductor; 300, member.

DETAILED DESCRIPTION

The inventors have recognized and appreciated designs for a connector that may he readily configured to operate according to multiple standards. A first version, for example, may support communication at a first data rate such as may be required for a first version of a standard. A second version, which may be economically manufactured using the tooling from which the first version is manufactured, may support communication at a second, higher data rate. Connector versions suitable for use in connection with a PCIe 4.0 or a PCIe 5.0 standard, for example, may be constructed in this way.

The electrical connector may include a plurality of conductors held by a housing. Contact tails of the plurality of conductors may extend from a mounting face of the housing therethrough. The mounting face of the housing may include a slot. In some embodiments, the slot may expose portions of ground conductors of the connector and receive a member coupled with the exposed portions of the ground conductors such that the electrical connector can meet high performance requirements. The member may be inserted into or molded in the slot. In some embodiments, the slot may or may not receive a member that is insulative when the electrical connector does not need to meet the high performance requirements. Such a configuration enables the same connector to be compatible with multiple performance protocols.

In some embodiments, when the first signal conductors of the electrical connector do not need to transmit high-frequency and high-speed signals, there may be no member arranged in the slot or may be a predetermined member (such as an insulating member) arranged in the slot. When the electrical connector needs to transmit high-frequency and high-speed signals, the slot may receive another predetermined member (such as a conductive plastic member), such that the electrical connector can meet high performance requirements. Accordingly, the insulating housings that meet the two performance requirements may have the same structure, such that the insulating housings may be made with the same mold, which greatly reduces the production costs of electrical connectors. In addition, because the insulating housings of the two electrical connectors have the same structure, there is no need to reserve respective insulating housings for the two electrical connectors during manufacturing, which can reduce the inventory and management costs of the electrical connectors. Based on this, the present electrical connector can be reasonably configured according to an electronic system to which the electrical connector is applied, such that both its cost and performance can meet the needs of users, and the electrical connector has high market competitiveness.

In the following description, numerous details are provided to enable a thorough understanding of the present disclosure. However, a person skilled in the art may understand that the following description only exemplarily shows the preferred embodiments of the present disclosure, and the present disclosure may be implemented without one or more such details. In addition, in order to avoid confusion with the present disclosure, some technical features known in the art have not been described in detail.

As shown in FIGS. 1-5, an electrical connector is provided according to an aspect of the disclosure. The electrical connector may include a card edge connector and the like. The card edge connector may be used to connect an electronic card such as a memory card. In the embodiment shown in the figures, the electrical connector is a plug electrical connector. The plug electrical connector may be inserted into a socket electrical connector, such that signals may be transmitted between multiple electronic devices. In other embodiments not shown in the figures, the electrical connector may also be a socket electrical connector. A plug electrical connector may be inserted into the socket electrical connector, such that signals may be transmitted between multiple electronic devices.

The electrical connector may include an insulating housing 100 and a plurality of conductors 200. The plurality of conductors 200 may be arranged in the insulating housing 100. The plurality of conductors 200 may be spaced apart from one another to ensure that the conductors 200 are electrically insulated from one another. A front side of the insulating housing 100 may expose portions of the plurality of conductors 200 including, for example, front ends of the conductors 200. Thus, when the electrical connector is engaged with an adapted electrical connector (not shown), the conductors 200 may be electrically coupled with conductors in the adapted electrical connector. When the electrical connector is configured as a plug electrical connector, the front ends of the plurality of conductors 200 protrude from the front side of the insulating housing 100 so as to be inserted into a socket electrical connector and coupled with conductors therein. When the electrical connector is configured as a socket electrical connector, the front side of the insulating housing 100 may be provided with a receiving groove, and a side wall of the receiving groove may expose the front ends of the conductors 200. The receiving groove may receive an adapted plug electrical connector or receive an adapted electronic card. Thus, optionally, the electrical connector may also be engaged with other electronic device directly, not by means of an adapted electrical connector. A back side of the insulating housing 100 may expose rear ends of the plurality of conductors 200, such that the plurality of conductors 200 are electrically coupled with conductors on a circuit board (not shown) when the electrical connector is mounted on the circuit board.

The plurality of conductors 200 may be arranged along a longitudinal direction (that is, a length direction of the electrical connector). In the figures, X represents the longitudinal direction: Y represents a transverse direction (that is, a width direction of the electrical connector); and the longitudinal direction X is perpendicular to the transverse direction Y. In some embodiments, the plurality of conductors 200 may include a plurality of first signal conductors 211 and a plurality of first ground conductors 212. The plurality of first signal conductors 211 may be interspersed with the plurality of first ground conductors 212. In the embodiment shown in the figures, a pair of adjacent first signal conductors 211 may be used to transmit a differential signal, and adjacent pairs of first signal conductors 211 may be spaced apart by a first ground conductor 212. It should be appreciated that the plurality of first signal conductors 211 and the plurality of first ground conductors 212 may be arranged in any other pattern to apply to different types of electrical connectors.

The back side of the insulating housing 100 may be provided with a slot 130. The slot 130 may expose the plurality of first ground conductors 212. The slot 130 may have any suitable shape, as long as it can expose the plurality of first ground conductors 212. The slot 130 is used to receive a member 300. The member 300 will be described in detail below.

Figure 5:
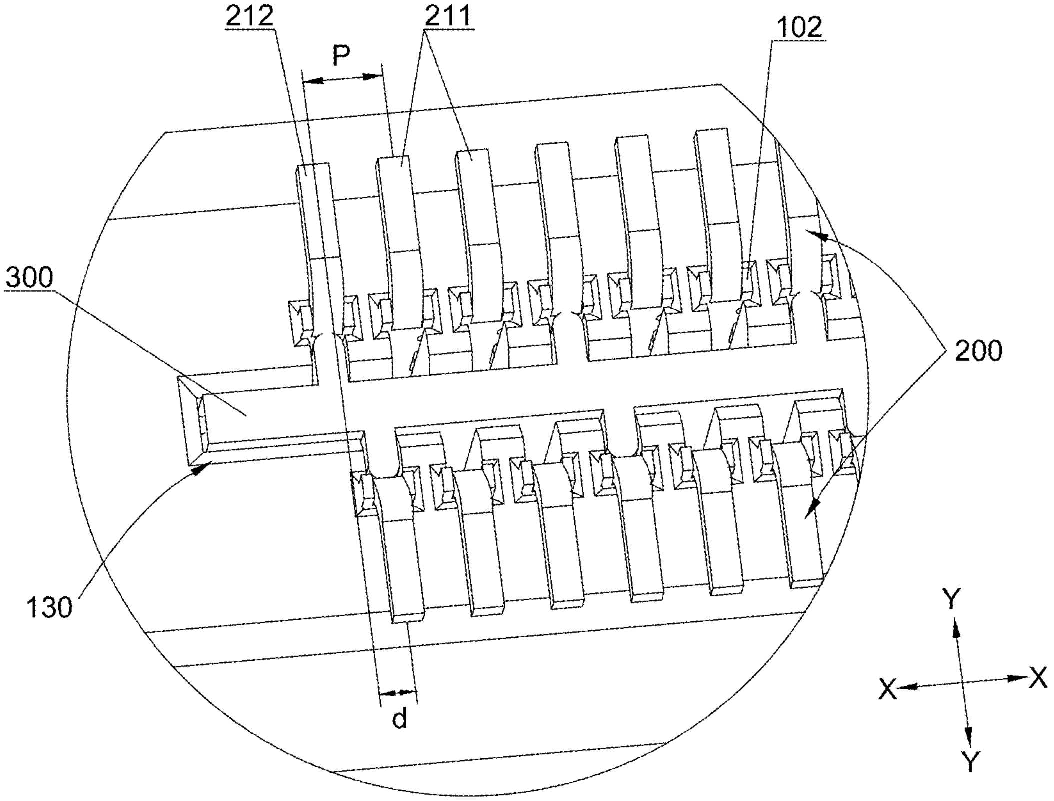
FIG. 5 is an enlarged view of a portion of the electrical connector within the circle marked "B" in FIG. 4.
Figure 7:
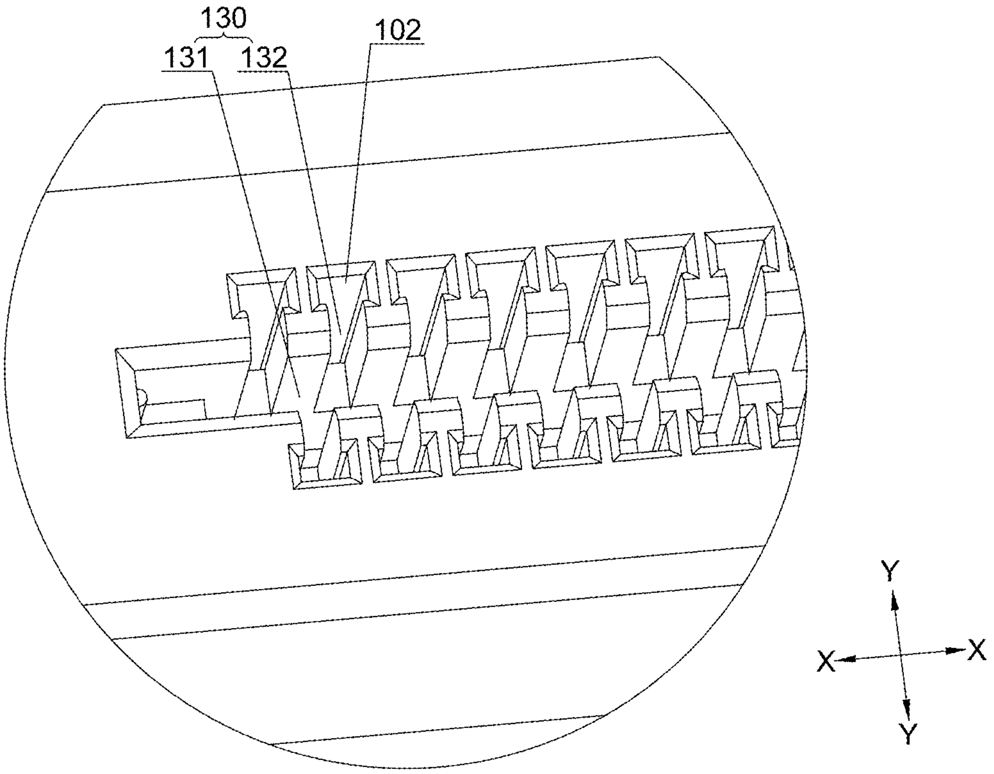
FIG. 7 is an enlarged view of a portion of the insulating housing within the circle marked "C" in FIG. 6.

The plurality of conductors 200 may be fabricated separately from the insulating housing 100, and then mounted in a plurality of conductor installation grooves 102 in the insulating housing 100 in one-to-one correspondence, as shown in FIGS. 5 and 7. The signal conductors and the ground conductors may have a substantially uniform size. The plurality of conductor installation grooves 102 may have a uniform size. In this case, the slat 130 may also expose the plurality of first signal conductors 211. Specifically, a side wall of the slot 130 may expose each of the plurality of first signal conductors 211 and the plurality of first ground conductors 212. In this way, the structure of the slot 130 can be simplified as much as possible, for example, the slot 130 may have a regular shape, such as a rectangle. Thus, the slot 130 is simple in structure and easy to fabricate. In addition, the plurality of first signal conductors 211 and the plurality of first ground conductors 212 may be arranged in any pattern without changing the structure of the insulating housing 100. The insulating housing 100 has strong versatility. This can reduce types of molds to reduce production costs.

Figure 6:
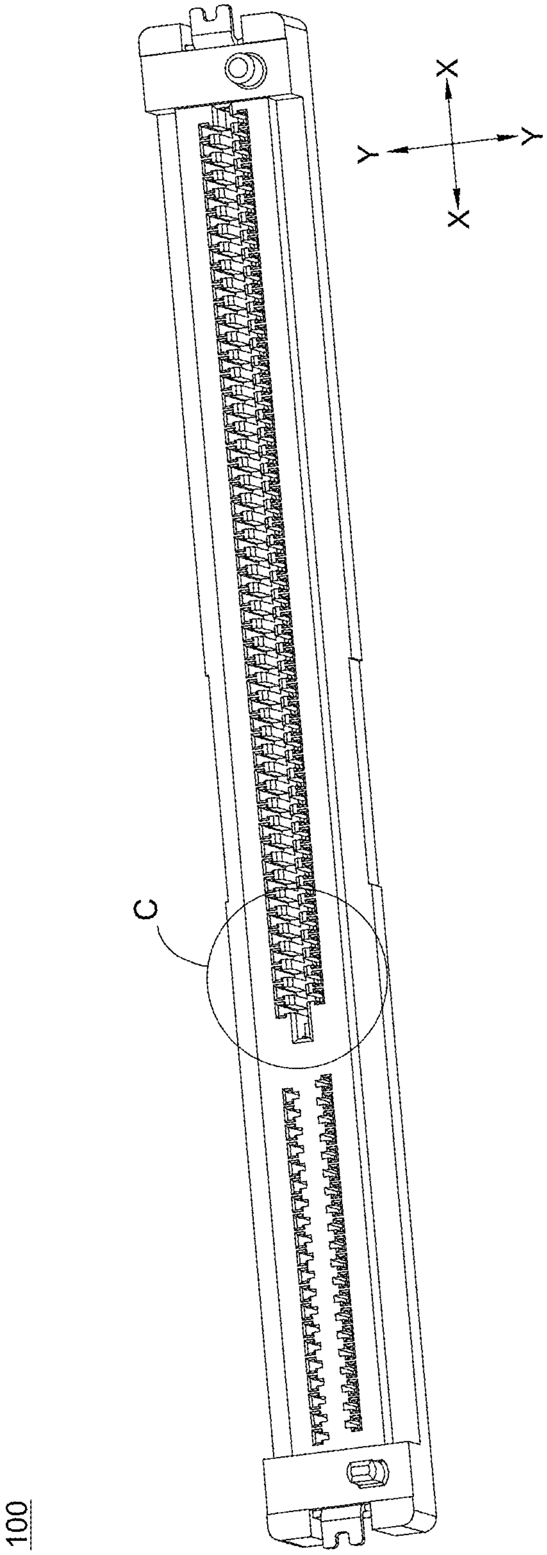
FIG. 6 is a perspective view of an insulating housing of the electrical connector shown in FIG. 1.

In some embodiments, as shown in FIGS. 6 and 7, the slot 130 may include a main opening 131 and a plurality of branch openings 132. The main opening 131 is of an elongated shape extending along the longitudinal direction X. The plurality of branch openings 132 extends from a side of the main opening 131 along the transverse direction Y. Each branch opening 132 corresponds to a conductor installation groove 102. For the slot 130 to expose the plurality of first signal conductors 211 and the plurality of first ground conductors 212, the plurality of branch openings 132 may communicate with the plurality of conductor installation grooves 102 in one-to-one correspondence. The plurality of branch openings 132 may expose the plurality of first signal conductors 211 and the plurality of first ground conductors 212, respectively. That is, each branch opening 132 may expose a first signal conductor 211 or a first ground conductor 212. Such arrangement may enable the member 300 to have a small size, which reduces the material for making the member 300 and lower the cost of manufacturing the electrical connector. The small opening area of the slot 130 enable the insulating housing 100 to have high structural strength without changing the size of the insulating housing 100.

In some embodiments, the slot 130 may include an elongated main opening 131 and a plurality of branch openings 131 extending from a side of the main opening 131 along the transverse direction Y. The plurality of branch openings 132 may expose the plurality of first ground conductors 212, respectively. In some embodiments, the plurality of first signal conductors 211 are not exposed.

In some embodiments, the member may be electrically coupled with the plurality of first ground conductors 212. The member may be in any suitable types that have been known in the art or may appear in the future, as long as they can be electrically coupled with the plurality of first ground conductors 212. After the plurality of first ground conductors 212 are electrically coupled with the member, signals transmitted by the electrical connector are tested. The inventors find that the electrical connector is more stable when transmitting the signals at a high frequency and a high speed, and can better meet users' requirements.

In some embodiments, the member may be made of a lossy material. Any suitable lossy material may be used for these and other structures that are "lossy." Materials that conduct, but with some loss, or material which by another physical mechanism absorbs electromagnetic energy over the frequency range of interest are referred to herein generally as "lossy" materials. Electrically lossy materials can be formed from lossy dielectric and/or poorly conductive and/or lossy magnetic materials. Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest. Electrically lossy material can be formed from material traditionally regarded as dielectric materials, such as those that have an electric loss tangent greater than approximately 0.05 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 Siemen/meter to about 10,000 Siemens/meter and preferably about 1 Siemen/meter to about 5,000

Siemens/meter. In some embodiments, material with a bulk conductivity of between about 10 Siemens/meter and about 200 Siemens/meter may he used. As a specific example, material with a conductivity of about 50 Siemens/meter may be used. However, it should be appreciated that the conductivity of the material may be selected empirically or through electrical simulation using known simulation tools to determine a suitable conductivity that provides a suitably low crosstalk with a suitably low signal path attenuation or insertion loss.

Electrically lossy materials may be partially conductive materials, such as those that have a surface resistivity between 1Ω/square and 100,000Ω/square. In some embodiments, the electrically lossy material has a surface resistivity between 10Ω/square and 1000Ω/square. As a specific example, the material may have a surface resistivity of between about 20Ω/square and 80Ω/square.

In some embodiments, electrically lossy material is formed by adding to a binder a filler that contains conductive particles. In such an embodiment, a lossy member may be formed by molding or otherwise shaping the binder with filler into a desired form. Examples of conductive particles that may be used as a tiller to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

Also, while the above-described binder materials may be used to create an electrically lossy material by forming a binder around conducting particle fillers, the invention is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

In some embodiments, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Celanese Corporation which can be filled with carbon fibers or stainless steel filaments. A lossy material, such as lossy conductive carbon filled adhesive preform, such as those sold by Techfilm of Billerica, Mass., US may also be used. This preform can include an epoxy binder filled with carbon fibers and/or other carbon particles. The binder surrounds carbon particles, which act as a reinforcement for the preform. Such a preform may be inserted in a connector wafer to form all or part of the housing. In some embodiments, the preform may adhere through the adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present disclosure is not limited in this respect.

In some embodiments, a lossy portion may be manufactured by stamping a preform or sheet of lossy material. For example, a lossy portion may be formed by stamping a preform as described above with an appropriate pattern of openings. However, other materials may be used instead of or in addition to such a preform. A sheet of ferromagnetic material, for example, may be used.

However, lossy portions also may be formed in other ways. In some embodiments, a lossy portion may be termed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

The member may effectively suppress resonance in the ground conductors, which may interfere with signals. Suppressing resonance can improve signal integrity. The electrical connector using the conductive plastic member may improve the integrity of high-frequency signals, and the signals are hardly distorted when passing through the electrical connector, such that an electronic system using the electrical connector can have higher operational stability. The electrical connector using the conductive plastic member may meet the requirements of PCI GEN 5 (Peripheral Component Interconnect Generation 5) for performance.

In some embodiments, the member may be made of an insulating material. The member may abut against the plurality of first ground conductors 212. The member may be in various types that have been known in the art or may appear in the future, as long as insulation can be created among the plurality of first ground conductors 212 abutted against the insulating member. On some embodiments, the member may be made of the same material as the insulating housing 100. This can reduce the types of materials for the electrical connector and reduce the difficulty of manufacturing. The electrical connector using the member may meet the requirements of PCI GEN 4 (Peripheral Component Interconnect Generation 4) for performance. For example, if the performance of the PCI GEN 5 is not required, the member of the insulating material may be mounted in the slot 130 of the insulating housing 100, or no member is mounted therein.

In some embodiments, when the first signal conductors 211 of the electrical connector do not need to transmit high-frequency and high-speed signals, there may be no member 300 arranged in the slot 130 or may be a predetermined member 300 (such as an insulating member) arranged in the slot 130. In some embodiments, when the electrical connector needs to transmit high-frequency and high-speed signals, the slot 130 may receive another predetermined member 300 (e.g., a conductive plastic member), such that the electrical connector can meet high performance requirements. Accordingly, the insulating housings 100 that meet the two performance requirements may have the same structure, such that the insulating housings 100 may be made with the same mold, which greatly reduces the production costs of electrical connectors. In addition, because the insulating housings 100 of the two electrical connectors have the same structure, there is no need to reserve respective insulating housings for the two electrical connectors during manufacturing, which can reduce the inventory and management costs of the electrical connectors. Based on this, the present electrical connector can be reasonably configured according to an electronic system to which the electrical connector is applied, such that both its cost and performance can meet the needs of users, and the electrical connector has high market competitiveness.

It could be appreciated that when there is no need to transmit high-frequency and high-speed signals by the electrical connector, the insulating housing 100 may not be provided with the slot 130. Then, the cost of the electrical connector may be further lowered. Of course, in a case where the cost and other factors are not considered, even if the electrical connector is not used to transmit high-frequency and high-speed signals, the slot 130 may also be provided, and the conductive plastic member is arranged in the slot 130.

In some embodiments, the plurality of conductors 200 may be not uniformly arranged at equal intervals along their entire longitudinal direction. As required by physical structure, data transmission and the like of an electrical connector, the plurality of conductors 200 may be divided into several piles along the longitudinal direction X of the electrical connector, and each pile is referred to as a segment herein. There are conductors 200 arranged in each segment, and in each segment, these conductors may be substantially uniformly arranged at equal intervals along the longitudinal direction. The conductor spacing between the adjacent segments may be relatively larger. Exemplarily, as shown in FIGS. 1-5, the insulating housing 100 may have a first segment 110 and a second segment 120. The first segment 110 and the second segment 120 may be spaced apart along the longitudinal direction X. The longitudinal dimensions of the first segment 110 and the second segment 120 may be the same or different. In the embodiment shown in the figures, the longitudinal dimension of the first segment 110 is greater than the longitudinal dimension of the second segment 120. In other embodiments not shown, the longitudinal dimension of the first segment 110 may be equal to or smaller than the longitudinal dimension of the second segment 120. Further, the numbers of the first segment(s) 110 and the second segment(s) 120 are not limited to those shown in the figures.

The plurality of first signal conductors 211, the plurality of first ground conductors 212 and the slot 130 may be located in the first segment 110. The plurality of conductors 200 may also include a plurality of second signal conductors 220. The plurality of second signal conductors 220 and the plurality of first signal conductors 211 may be the same or different. The plurality of second signal conductors 220 may be located in the second segment 120.

With this arrangement, the first signal conductors 211 in the first segment 110 may be used to transmit high-frequency and high-speed signals. The second signal conductors 220 in the second segment 120 may be used to transmit signals having low requirements for transmission rate and frequency. Therefore, when multiple kinds of signals need to be transmitted, the electrical connector may be configured to meet performance requirements and lower costs, such that the market competitiveness of the electrical connector is further improved.

It should be appreciated that the electrical connector may not include the second segment 120 but includes one or more first segments 110, when the electrical connector only needs to transmit high-frequency and high-speed signals.

Figure 4:
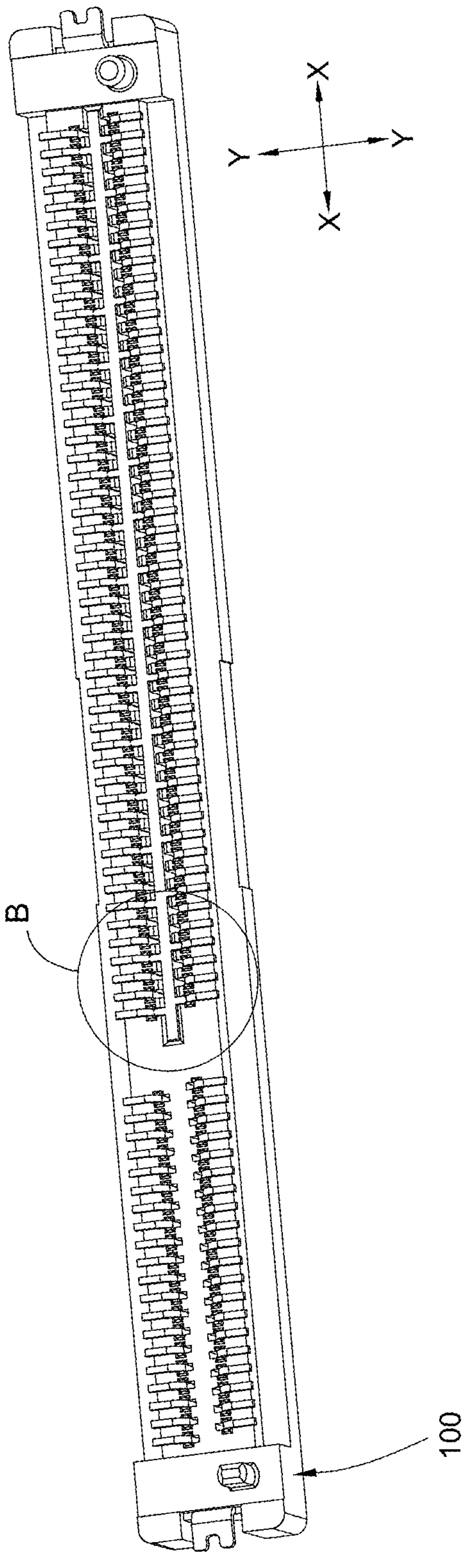
FIG. 4 is another perspective view of the electrical connector shown in FIG. 1, according to some embodiments.

In some embodiments, as shown in FIGS. 4 and 5, the plurality of conductors 200 may be arranged in two columns extending along the longitudinal direction X. The two columns may be separated along the transverse direction Y. The slot 130 may be located between the two columns along the transverse direction Y. Referring to FIG. 5, the two columns may be offset from each other by a predetermined distance d along the longitudinal direction X. It is found by the inventors that the transmission performance of the electrical connector can be improved when the two columns of conductors 200 are offset from each other certain distance along the longitudinal direction X.

Further, as shown in FIG. 5, the predetermined distance d may be substantially equal to half of the spacing P between the longitudinally adjacent conductors in the first segment 110. This spacing P may also be referred to as a pitch. As a result, the transmission performance of the electrical connector is better.

According to another aspect of the disclosure, an electrical connector is further provided. The electrical connector may include an insulating housing 100, a plurality of conductors 200, and a conductive plastic member.

The insulating housing 100 may have a first segment 110 and a second segment 120. The first segment 110 and the second segment 120 may be spaced apart along a longitudinal direction X.

The plurality of conductors 200 may be arranged in the insulating housing 100. The plurality of conductors 200 may be arranged along the longitudinal direction X. The plurality of conductors 200 may include a plurality of first signal conductors 211, a plurality of first ground conductors 212, and a plurality of second signal conductors 220. The plurality of first signal conductors 211 and the plurality of first ground conductors may be located in the first segment 110. The plurality of second signal conductors 220 may be located in the second segment 120. A front side of the insulating housing 100 exposes the plurality of conductors 200.

The conductive plastic member may be arranged in the first segment 110. The conductive plastic member may be electrically coupled with the plurality of first ground conductors 212. Thus, an electronic system using the electrical connector is more stable when transmitting high-frequency and high-speed signals, and can better meet needs of users. Moreover, for electronic systems having different signal transmission requirements, the electrical connector can be reasonably configured to meet performance requirements and lower costs, such that the market competitiveness of the electrical connector is improved.

In some embodiments, the insulating housing 100 may be provided with a slot 130 as described above, and the conductive plastic member is mounted in the insulating housing 100 by mounting into the slot 130. In some embodiments, the conductive plastic member may be embedded inside the insulating housing 100, not exposed. For example, the conductive plastic member may be formed in the insulating housing 100 by means of injection molding. It should be appreciated that the disclosure does not limit the processing and installation means of the conductive plastic member.

Therefore, the present disclosure has been described in way of the above several embodiments. It should be understood that a person skilled in the art can make more variations, modifications and improvements based on the teachings of the present disclosure, and these variations, modifications and improvements shall fall within the spirit and the protection scope of the present disclosure. The protection scope of the present disclosure is defined by the appended claims and their equivalent scopes. The foregoing embodiments are only for the purpose of illustration and description, and are not intended to limit the present disclosure to the scope of the described embodiments.

Various changes may be made to the illustrative structures shown and described herein. For example, the electrical connector may be any suitable electrical connector, such as card edge connecter, backplane connector, daughter card connector, stacking connector, Mezzanine connector, I/O connector, chip socket, Gen Z connector, etc. The principle of the present disclosure can be adopted, when these connectors are used to transmit signals.

Furthermore, although many inventive aspects are shown and described with reference to a vertical connector, it should be appreciated that aspects of the present disclosure is not limited in this regard. As mentioned, any of the inventive concepts, whether alone or in combination with one or more other inventive concepts, may be used in other types of electrical connectors, such as right angle connectors, coplanar electrical connectors, etc.

In the description of the present disclosure, it needs to be understood that the orientation or positional relationship indicated by the orientation terms such as "front", "rear", "upper", "lower", "left", "right", "transverse", "vertical", "perpendicular", "horizontal", "top", "bottom", etc. is usually based on the orientation shown in the drawings, and is only for the convenience of describing the present disclosure and simplifying the description. These orientation terms do not indicate or imply that the device or element has to have a specific orientation or be constructed and operated in a specific orientation, except as otherwise noted. Therefore, they cannot be understood as a limitation on the scope of the present disclosure, The orientation terms, "inside" and "outside", refer to the inside and outside relative to the contour of each component itself.

For ease of description, spatial terms, such as "above", "on", etc., can be used herein to describe the spatial relationship between one or more components or features shown in the drawings and other components or features. It should be understood that the spatial terms not only include the orientation of the components shown in the drawings, but also include other orientations in use or operation. For example, if the components in the drawings are inverted as a whole, a component "above other components or features" becomes to the component "below other a components or structures". Thus, the exemplary term "above" can include both orientations "above" and "below". In addition, these components or features can also be positioned at other different angles (for example, rotated by 90 degrees or other angles), and this disclosure intends to cover all of these situations.

It should be noted that the terms used herein are only for describing specific implementations, and are not intended to limit to the exemplary implementations according to the present application. As used herein, unless the context clearly indicates otherwise, the singular form is also intended to include the plural form, In addition, the use of "including", "comprising", "haying", "containing", or "involving", and variations thereof herein, is meant to encompass the items listed thereafter (or equivalents thereof) and/or as additional items.

It should be noted that the terms "first" and "second" in the description, the claims and the drawings of the application are used to distinguish similar objects, and are not necessarily used to describe a specific sequence. It should be understood that numbers used in this way can be interchanged under appropriate circumstances such that the embodiments of the present disclosure described herein can be implemented in a sequence other than those illustrated or described herein.

What is claimed is:

1. An electrical connector, comprising:
a plurality of conductors each comprising a mating contact portion, a contact tail, and an intermediate portion extending between the mating contact portion and the contact tail;
a housing holding the plurality of conductors, the housing comprising a first segment, a second segment spaced apart from the first segment, and a mounting face that the contact tails of the plurality of conductors extend therethrough, the mounting face comprising a slot; and
a member disposed in the slot, wherein:
the plurality of conductors are arranged in two columns,
the slot is disposed between the two columns,
the slot comprises a main opening elongated between the two columns, a first plurality of branch openings extending from a first side of the main opening towards one of the two columns, and a second plurality of branch openings extending from a second side of the main opening towards the other one of the two columns,
the member comprises a first plurality of protrusions extending towards the one of the two columns and a second plurality of protrusions extending towards the other one of the two columns,
the first plurality of branch openings are more than the first plurality of protrusions of the member, and
the second plurality of branch openings are more than the second plurality of protrusions of the member.

2. The electrical connector according to claim 1, wherein:
the first segment and the second segment of the housing are spaced apart along a longitudinal direction,
the plurality of conductors comprise a plurality of first signal conductors, a plurality of first ground conductors, and a plurality of second signal conductors,
the plurality of first signal conductors, the plurality of first ground conductors, and the slot are located in the first segment, and
the plurality of second signal conductors are located in the second segment.

3. The electrical connector according to claim 2, comprising:
the member electrically coupled with the plurality of first ground conductors.

4. The electrical connector according to claim 2, wherein:
the member abuts against the plurality of first ground conductors.

5. The electrical connector according to claim 1, wherein the slot exposes portions of the intermediate portions of the plurality of conductors.

6. The electrical connector according to claim 2, wherein:

the main opening is elongated along the longitudinal direction, the first plurality of branch openings and the second plurality of branch openings extend from the first side and the second side of the main opening, respectively, along a transverse direction perpendicular to the longitudinal direction, and the first plurality of branch openings and the second plurality of branch openings expose portions of the intermediate portions of the plurality of first signal conductors and the plurality of first ground conductors, respectively.

7. The electrical connector according to claim 1, wherein:

the two columns extending along a longitudinal direction, and the two columns are offset from each other a predetermined distance along the longitudinal direction.

8. The electrical connector according to claim 7, wherein the predetermined distance is equal to half of the spacing between longitudinally adjacent conductors in the first segment.

9. The electrical connector according to claim 1, wherein the electrical connector is a plug electrical connector.

10. The electrical connector according to claim 1, wherein the member is insulative or lossy.

11. The electrical connector according to claim 1, wherein:

the housing comprises the member disposed in the slot to combine with a surface of the first segment of the housing that constitutes a first part of the mounting face, and the second segment of the housing has a surface that constitutes a second part of the mounting face without an insert.

12. An electrical connector, comprising:

a plurality of conductors comprising a plurality of first signal conductors, a plurality of first ground conductors, and a plurality of second signal conductors; and a housing comprising a first segment and a second segment spaced apart along a longitudinal direction, each of the first and second segments comprising a tongue, the first segment holding the plurality of first signal conductors and the plurality of first ground conductors, the second segment holding the plurality of second signal conductors, the first segment comprising a single, unitary member electrically coupled with the plurality of first ground conductors, wherein:

the plurality of conductors extend through the housing with contact tails exposed at a mounting face and mating contact portions embedded in a respective tongue, the plurality of first ground conductors are arranged in two columns, and the single, unitary member is electrically coupled with the plurality of first ground conductors in the two columns.

13. The electrical connector according to claim 12, wherein:

the housing comprises a slot, and the member is accommodated in the slot.

14. The electrical connector according to claim 13, wherein the member is lossy.

15. The electrical connector according to claim 12, wherein:

the plurality of first signal conductors and the plurality of first ground conductors are arranged in the two columns in the first segment and extending along the longitudinal direction, and the two columns are offset from each other by a predetermined distance along the longitudinal direction.

16. The electrical connector according to claim 15, wherein the predetermined distance is equal to half of the spacing between longitudinally adjacent conductors in the first segment.

17. The electrical connector according to claim 13, wherein:

the plurality of conductors each comprises an intermediate portion extending between the mating contact portion and the contact tail, and the slot exposes portions of the intermediate portions of the plurality of conductors in the first segment.

18. The electrical connector according to claim 17, wherein:

the slot comprises a main opening elongated along the longitudinal direction and a plurality of branch openings extending from a side of the main opening along a transverse direction perpendicular to the longitudinal direction, and the plurality of branch openings expose portions of the intermediate portions of the plurality of first signal conductors and the plurality of first ground conductors, respectively.

19. The electrical connector according to claim 18, wherein:

the member comprises a plurality of protrusions extending into a subset of the plurality of branch openings.

20. An electrical connector, comprising:

a plurality of conductors each comprising a mating contact portion, a contact tail, and an intermediate portion extending between the mating contact portion and the contact tail, the plurality of conductors comprising a plurality of first signal conductors, a plurality of first ground conductors, and a plurality of second signal conductors;

a housing comprising a first segment and a second segment spaced apart along a longitudinal direction, and a mounting face that the contact tails of the plurality of conductors extend therethrough, the mounting face comprising a slot aligned with the first segment, the first segment comprising a first tongue and holding the plurality of first signal conductors and the plurality of first ground conductors with the mating contact portions of the first signal conductors and first ground conductors embedded in the first tongue, the second segment comprising a second tongue and holding the plurality of second signal conductors with the mating contact portions of the second signal conductors embedded in the second tongue; and a member removably disposed in the slot and electrically coupled with the plurality of first ground conductors, wherein the member combines with a surface of the first segment of the housing to form a first part of the mounting face, and the second segment of the housing has a surface that forms a second part of the mounting face without an insert.

* * * * *